(12) United States Patent
Yagi et al.

(10) Patent No.: US 12,209,025 B2
(45) Date of Patent: Jan. 28, 2025

(54) AMMONIA SYNTHESIS SYSTEM AND AMMONIA PRODUCTION METHOD

(71) Applicant: Tsubame BHB Co., Ltd., Chuo-ku (JP)

(72) Inventors: Taichi Yagi, Yokkaichi (JP);
Katsunobu Yamaguchi, Yokohama (JP)

(73) Assignee: Tsubame BHB Co., Ltd., Chuo-ku (JP)

( * ) Notice: Subject to any disclaimer, the term of this patent is extended or adjusted under 35 U.S.C. 154(b) by 853 days.

(21) Appl. No.: 17/287,025

(22) PCT Filed: Oct. 21, 2019

(86) PCT No.: PCT/JP2019/041370
§ 371 (c)(1),
(2) Date: Apr. 20, 2021

(87) PCT Pub. No.: WO2020/085324
PCT Pub. Date: Apr. 30, 2020

(65) Prior Publication Data
US 2021/0380426 A1    Dec. 9, 2021

(30) Foreign Application Priority Data

Oct. 23, 2018  (JP) ................................. 2018-198952

(51) Int. Cl.
*C01C 1/04* (2006.01)
*B01J 19/24* (2006.01)

(52) U.S. Cl.
CPC ............. *C01C 1/047* (2013.01); *B01J 19/245* (2013.01); *B01J 2219/00074* (2013.01)

(58) Field of Classification Search
CPC . B01J 19/00; B01J 19/24; B01J 19/245; B01J 2219/00; B01J 2219/00045;
(Continued)

(56) References Cited

U.S. PATENT DOCUMENTS 3,350,170 A  10/1967  Finneran et al.
4,180,543 A  12/1979  Ward
(Continued)

FOREIGN PATENT DOCUMENTS

CN   202519043 U   11/2012
CN   102815722 A   12/2012
(Continued)

OTHER PUBLICATIONS

WO 2018069212 A1 and machine translation (Year: 2018).*
(Continued)

*Primary Examiner* — Natasha E Young
(74) *Attorney, Agent, or Firm* — Oblon, McClelland, Maier & Neustadt, L.L.P.

(57) ABSTRACT

The ammonia synthesis system of the present invention includes an ammonia synthesis reaction unit that synthesizes ammonia from nitrogen and hydrogen; an ammonia cooler that cools an ammonia-containing gas discharged from the ammonia synthesis reaction unit; a gas-liquid separator that separates ammonia liquefied by the ammonia cooler from a circulated gas; and an ammonia synthesizing gas supplying unit that supplies nitrogen gas and hydrogen gas, the circulated gas being supplied to the ammonia synthesis reaction unit, the circulated gas supplied to the ammonia synthesis unit having an ammonia gas concentration of 3% by volume or more. The method for producing ammonia of the present invention includes reacting nitrogen and hydrogen using a circulated gas having an ammonia gas concentration of 3% by volume or more and using an ammonia synthesis catalyst under a condition of a reaction pressure of 10 MPa or less to produce ammonia.

9 Claims, 8 Drawing Sheets

(58) Field of Classification Search
CPC ... B01J 2219/00051; B01J 2219/00074; C01C 1/00; C01C 1/02; C01C 1/04; C01C 1/0405; C01C 1/0458; C01C 1/047
See application file for complete search history.

(56) References Cited

U.S. PATENT DOCUMENTS

| | | | |
|---|---|---|---|
| 4,367,206 A | 1/1983 | Pinto | |
| 4,568,530 A | 2/1986 | Mandelik et al. | |
| 4,568,531 A * | 2/1986 | van Dijk | B01J 8/0488 423/361 |
| 4,689,208 A | 8/1987 | Pinto | |
| 4,699,772 A | 10/1987 | de Lathouder | |
| 4,867,959 A * | 9/1989 | Grotz | C01C 1/0405 423/361 |
| 5,032,364 A | 7/1991 | Pinto | |
| 7,070,750 B2 * | 7/2006 | Lippmann | C01C 1/0411 423/362 |
| 2004/0042951 A1 | 3/2004 | Lippmann et al. | |
| 2006/0099131 A1 | 5/2006 | Singh et al. | |
| 2008/0056964 A1 | 3/2008 | Singh et al. | |
| 2008/0107585 A1 | 5/2008 | Singh et al. | |
| 2011/0286907 A1 | 11/2011 | Nakamura et al. | |
| 2015/0251918 A1 * | 9/2015 | Nurse | C01B 3/38 422/148 |
| 2017/0283271 A1 | 10/2017 | Sakurai et al. | |

FOREIGN PATENT DOCUMENTS

| | | |
|---|---|---|
| EP | 1 083 150 A1 | 3/2001 |
| EP | 2 374 758 A1 | 10/2011 |
| JP | 53-130283 A | 11/1978 |
| JP | 55-71622 A | 5/1980 |
| JP | 60-235718 A | 11/1985 |
| JP | 61-502678 A | 11/1986 |
| JP | 2004-514633 A | 5/2004 |
| JP | 2006-131493 A | 5/2006 |
| JP | 2010-159194 A | 7/2010 |
| JP | 2011-246311 A | 12/2011 |
| JP | 2016-56039 A | 4/2016 |
| JP | 2016-141599 A | 8/2016 |
| JP | 2020-66573 A | 4/2020 |
| WO | WO 90/06281 A1 | 6/1990 |
| WO | WO 2017/149718 A1 | 9/2017 |
| WO | WO 2017/215814 A1 | 12/2017 |
| WO | WO 2020/085324 A1 | 4/2020 |

OTHER PUBLICATIONS

International Search Report issued Nov. 26, 2019 in PCT/JP2019/041370 filed Oct. 21, 2019, 3 pages.

Flórez-Orrego, D., et al., "Modeling and optimization of an industrial ammonia synthesis unit: An exergy approach", Energy, vol. 137, 2017, pp. 234-250.

Extended European Search Report issued Jun. 21, 2022 in European Patent Application No. 19876356.7, 9 pages.

European Office Action issued Apr. 30, 2024 in European Patent Application No. 19876356.7, 8 pages.

Tengku Mohd Hilmi Bin Tengku Zainal Alam Shah, "Simulation Study of Ammonia Synthesis Loop Reactor-Separator System", Universiti Teknologi Petronas, Sep. 2012, 56 pages.

* cited by examiner

AMMONIA SYNTHESIS SYSTEM AND AMMONIA PRODUCTION METHOD

TECHNICAL FIELD

The present invention relates to an ammonia synthesis system for synthesizing ammonia from nitrogen gas and hydrogen gas and a method for producing ammonia.

BACKGROUND ART

Nitrogenous fertilizers, such as ammonium sulfate and urea, which are widely used in agricultural production, are produced using ammonia as a main raw material. Thus, ammonia is considered as a very important chemical material and a method for producing ammonia has been studied.

An example of the most widely used techniques for producing ammonia is the Haber-Bosch Process. The Haber-Bosch Process is a method for producing ammonia by bringing nitrogen and hydrogen as raw materials into contact with a catalyst containing iron as a main component under a high temperature and a high pressure.

As a synthetic method other than the Haber-Bosch Process, a synthetic method using a supported metal catalyst with ruthenium supported on various carriers has been studied.

Recently, for further reducing the ammonia production cost, energy reduction in an ammonia synthesis process has been advanced. For example, PTL 1 discloses an ammonia synthesis system in which ammonia gas containing unreacted gases is cooled to a temperature of 30 to 50° C. with a water cooling-type or air cooling-type cooler in extracting the product ammonia as liquid. Thus, a need of using a part of the product ammonia as a chiller refrigerant is eliminated, and thus the cooling cost can be reduced and the operation efficiency in ammonia synthesis can be increased.

CITATION LIST

Patent Literature

PTL 1: JP 2016-56039 A

SUMMARY OF INVENTION

Technical Problem

However, for extracting the product ammonia as liquid from the ammonia gas containing unreacted gases using a water cooling-type or air cooling-type cooler, the pressure of the ammonia gas in cooling is to be increased. In paragraph [0021] in PTL 1, there is a statement that the reaction pressure in the ammonia synthesis is 7 to 25 MPa, and more preferably 10 to 20 MPa. However, in practice, for increasing the efficiency for extracting the product ammonia as liquid, a reaction pressure exceeding 10 MPa is needed (see paragraph [0033] in PTL 1, 13.8 MPa in Examples). Thus, in an ammonia synthesis system described in PTL 1, although the energy required for cooling the ammonia gas is reduced, there is a problem in that the energy required for increasing the reaction pressure in ammonia synthesis is even increased and thus the total energy required for producing ammonia is not largely reduced. Note that the energy required for cooling the ammonia gas is, for example, an energy for driving a cooler for cooling the ammonia gas, and the energy required for increasing the reaction pressure in ammonia synthesis is, for example, an energy for driving a gas compressor used for compressing gas.

Thus, the present invention has an object to provide an ammonia synthesis system and an ammonia production method in which an energy required for producing ammonia can be reduced while securing the ability to produce ammonia.

Solution to Problem

As a result of intensive and extensive studies for achieving the above object, the present inventors have found that the above object can be achieved by using a reaction pressure in ammonia synthesis of a prescribed value or less and an ammonia gas concentration in a circulated gas used for the ammonia synthesis of a prescribed value or more, completing the present invention. Specifically, the present invention is as follows.

[1] An ammonia synthesis system including: an ammonia synthesis reaction unit that includes one or two or more ammonia synthesis reactors that synthesize ammonia from nitrogen and hydrogen using an ammonia synthesis catalyst under a condition of a reaction pressure of 10 MPa or less; an ammonia cooler that cools an ammonia-containing gas which is discharged from the ammonia synthesis reaction unit and which contains ammonia gas synthesized by the ammonia synthesis reaction unit; a gas-liquid separator that separates liquefied ammonia produced from the ammonia-containing gas cooled by the ammonia cooler from a circulated gas which contains unreacted nitrogen gas, unreacted hydrogen gas, and ammonia gas; and an ammonia synthesizing gas supplying unit that supplies nitrogen gas and hydrogen gas to be added to at least one of the ammonia-containing gas and the circulated gas; the circulated gas or the circulated gas having added thereto the nitrogen gas and hydrogen gas supplied by the ammonia synthesizing gas supplying unit being supplied to the ammonia synthesis reaction unit, the circulated gas supplied to the ammonia synthesis reaction unit having an ammonia gas concentration of 3% by volume or more.

[2] The ammonia synthesis system according to the above [1], wherein the ammonia cooler cools the ammonia-containing gas with a cooling temperature of −40 to 15° C.

[3] The ammonia synthesis system according to the above [1] or [2], wherein the ammonia synthesis reaction unit includes two or more ammonia synthesis reactors, the two or more ammonia synthesis reactors being connected in series.

[4] The ammonia synthesis system according to any one of the above [1] to [3], wherein each of the ammonia synthesis reactors in the ammonia synthesis reaction unit has an inlet gas having a temperature of 100 to 600° C.

[5] The ammonia synthesis system according to any one of the above [1] to [4], wherein the ammonia synthesis reaction unit further includes between the two or more ammonia synthesis reactors a heat exchanger that cools an outlet gas of the ammonia synthesis reactors.

[6] The ammonia synthesis system according to any one of the above [1] to [5], wherein an outlet gas of the ammonia synthesis reactors is cooled by using at least either of the nitrogen gas and hydrogen gas supplied by the ammonia synthesizing gas supplying unit or the circulated gas.

[7] The ammonia synthesis system according to any one of the above [1] to [6], wherein each of the ammonia synthesis reactors in the ammonia synthesis reaction unit has an inlet gas having a ratio of hydrogen gas to nitrogen gas ($H_2/N_2$: molar ratio) of 0.5 to 4.

[8] The ammonia synthesis system according to any one of the above [1] to [7], further including an ammonia synthesizing gas compressor that compresses the nitrogen gas and hydrogen gas supplied by the ammonia synthesizing gas supplying unit and a circulated gas compressor that compresses the circulated gas separated by the gas-liquid separator.

[9] The ammonia synthesis system according to any one of the above [1] to [8], wherein the ammonia cooler cools the ammonia-containing gas by heat exchange between a liquid having a boiling point at 1 atm of −33.0° C. or higher and the ammonia-containing gas.

[10] A method for producing ammonia, the method including: an ammonia-containing gas production step of reacting nitrogen and hydrogen using an ammonia synthesis catalyst under a condition of a reaction pressure of 10 MPa or less to produce an ammonia-containing gas which contains ammonia gas; an ammonia-containing gas cooling step of cooling the ammonia-containing gas produced by the ammonia-containing gas production step; an ammonia separation step of separating ammonia liquefied by cooling of the ammonia-containing gas by the ammonia-containing gas cooling step from a circulated gas which contains unreacted nitrogen gas, unreacted hydrogen gas, and ammonia gas, to obtain liquefied ammonia; and an ammonia synthesizing gas supply step of supplying nitrogen gas and hydrogen gas to be added to at least one of the ammonia-containing gas and the circulated gas, the ammonia-containing gas production step being a step of reacting nitrogen and hydrogen using the circulated gas or the circulated gas having added thereto the nitrogen gas and hydrogen gas supplied by the ammonia synthesizing gas supply step, the circulated gas used in the ammonia-containing gas production step having an ammonia gas concentration of 3% by volume or more.

[11] The method for producing ammonia according to the above [10], wherein in the ammonia-containing gas cooling step, the ammonia-containing gas is cooled with a cooling temperature of −40 to 15° C.

[12] The method for producing ammonia according to the above [10] or [11], wherein the ammonia-containing gas production step includes at least a first ammonia-containing gas production step of reacting nitrogen and hydrogen using the circulated gas or the circulated gas having added thereto the nitrogen gas and hydrogen gas supplied by the ammonia synthesizing gas supply step and using an ammonia synthesis catalyst to produce a first ammonia-containing gas which contains ammonia gas and a second ammonia-containing gas production step of reacting nitrogen and hydrogen using the first ammonia-containing gas and using an ammonia synthesis catalyst to produce a second ammonia-containing gas which contains ammonia gas at a concentration higher than in the first ammonia-containing gas.

[13] The method for producing ammonia according to the above [12], wherein the circulated gas or the circulated gas having added thereto the nitrogen gas and hydrogen gas supplied by the ammonia synthesizing gas supply step used in the first ammonia-containing gas production step has a temperature of 100 to 600° C., and the first ammonia-containing gas used in the second ammonia-containing gas production step has a temperature of 100 to 600° C.

[14] The method for producing ammonia according to the above [12] or [13], wherein the ammonia-containing gas production step includes at least a first ammonia-containing gas cooling step of cooling the first ammonia-containing gas by heat exchange, and the second ammonia-containing gas production step produces the second ammonia-containing gas by using the first ammonia-containing gas cooled by the first ammonia-containing gas cooling step.

[15] The method for producing ammonia according to the above [12] or [13], wherein the ammonia-containing gas production step includes at least a first ammonia-containing gas cooling step of cooling the first ammonia-containing gas using at least either of the nitrogen gas and hydrogen gas supplied by the ammonia synthesizing gas supply step or the circulated gas, and the second ammonia-containing gas production step produces the second ammonia-containing gas by using the first ammonia-containing gas cooled by the first ammonia-containing gas cooling step.

[16] The method for producing ammonia according to any one of the above [12] to [15], wherein the circulated gas or the circulated gas having added thereto the nitrogen gas and hydrogen gas supplied by the ammonia synthesizing gas supply step used in the first ammonia-containing gas production step and the first ammonia-containing gas used in the second ammonia-containing gas production step each have a ratio of hydrogen gas to nitrogen gas ($H_2/N_2$: molar ratio) of 0.5 to 4.

[17] The method for producing ammonia according to any one of the above [10] to [16], further including an ammonia synthesizing gas compression step of compressing the nitrogen gas and hydrogen gas supplied by the ammonia synthesizing gas supply step and a circulated gas compression step of compressing the circulated gas separated in the ammonia-containing gas cooling step.

[18] The method for producing ammonia according to any one of the above [10] to [17], wherein in the ammonia-containing gas cooling step, the ammonia-containing gas is cooled by heat exchange between a liquid having a boiling point at 1 atm of −33.0° C. or higher and the ammonia-containing gas.

Advantageous Effects of Invention

The present invention can provide an ammonia synthesis system and an ammonia production method in which the energy required for producing ammonia can be reduced while securing the ability to produce ammonia.

DESCRIPTION OF EMBODIMENTS

[Ammonia Synthesis System of an Embodiment of the Present Invention]

Figure 1:
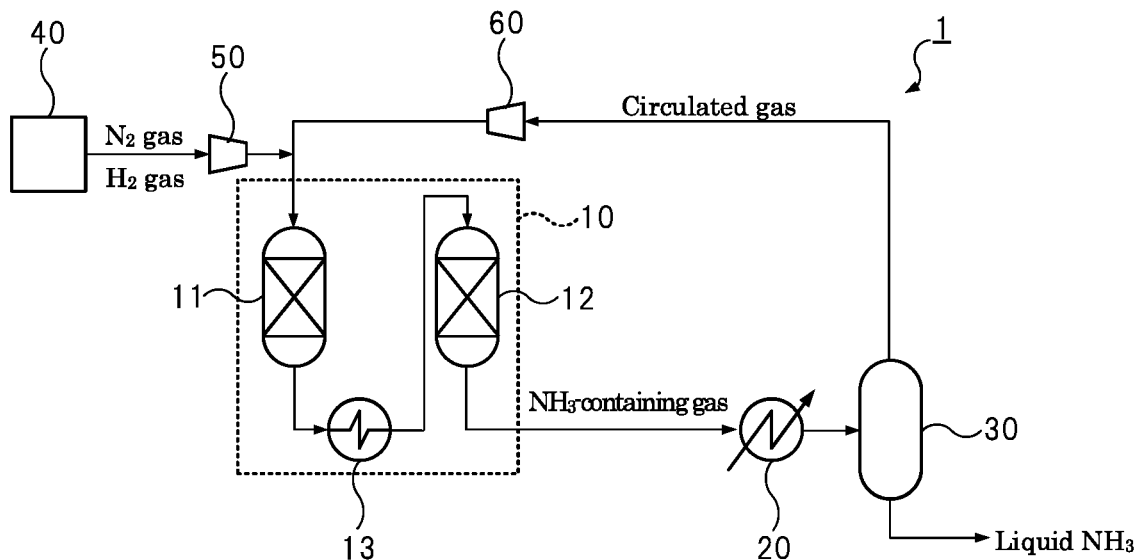
FIG. 1 is a schematic view illustrating an ammonia synthesis system according to an embodiment of the present invention.

An ammonia synthesis system of an embodiment of the present invention will be described with reference to FIG. 1. FIG. 1 is a schematic view illustrating an ammonia synthesis system according to an embodiment of the present invention.

An ammonia synthesis system 1 of an embodiment of the present invention includes: an ammonia synthesis reaction unit 10 that includes two ammonia synthesis reactors 11 and 12 that synthesize ammonia from nitrogen and hydrogen using an ammonia synthesis catalyst; an ammonia cooler 20 that cools an ammonia-containing gas ($NH_3$-containing gas) which is discharged from the ammonia synthesis reaction unit 10 and which contains ammonia gas synthesized in the ammonia synthesis reaction unit 10; a gas-liquid separator 30 that separates liquefied ammonia which is produced from the ammonia-containing gas cooled by the ammonia cooler 20 from a circulated gas which contains unreacted nitrogen gas, unreacted hydrogen gas, and ammonia gas; and an ammonia synthesizing gas supplying unit 40 that supplies nitrogen gas and hydrogen gas to be added to the circulated gas. Then, the circulated gas having added thereto the nitrogen gas and hydrogen gas supplied by the ammonia synthesizing gas supplying unit 40 is supplied to the ammonia synthesis reaction unit 10.

The ammonia synthesis system 1 in an embodiment of the present invention may further include, as desired, an ammonia synthesizing gas compressor 50 that compresses the nitrogen gas and hydrogen gas supplied from the ammonia synthesizing gas supplying unit 40 and a circulated gas compressor 60 that compresses the circulated gas separated by the gas-liquid separator 30.

(Ammonia Synthesis Reaction Unit)

As described above, the ammonia synthesis reaction unit 10 includes the two ammonia synthesis reactors 11 and 12 that synthesize ammonia from nitrogen and hydrogen using an ammonia synthesis catalyst. Then, the circulated gas having added thereto the nitrogen gas and hydrogen gas supplied by the ammonia synthesizing gas supplying unit 40 is supplied to the ammonia synthesis reaction unit 10.

<Ammonia Synthesis Catalyst>

The ammonia synthesis catalyst used in the ammonia synthesis reactors 11 and 12 is not particularly limited as long as it is an ammonia synthesis catalyst that is capable of synthesizing ammonia from nitrogen and hydrogen at a reaction pressure of 10 MPa or less. The ammonia synthesis catalyst used in the ammonia synthesis reactors 11 and 12 is preferably a catalyst that has a high activity even at a high ammonia concentration.

Examples of the ammonia synthesis catalyst used in the ammonia synthesis reactors 11 and 12 include (i) a supported metal catalyst prepared using a conductive mayenite compound as a carrier, (ii) a supported metal catalyst prepared using a two-dimensional electride compound or a precursor compound thereof as a carrier, and (iii) a supported metal catalyst prepared using a composite of a carrier substrate and a metal amide supported on the carrier substrate as a carrier, the carrier substrate containing at least one metal oxide selected from $ZrO_2$, $TiO_2$, $CeO_2$, and MgO, the metal amide being represented by the formula $M(NH_2)_x$ (wherein M represents at least one selected from Li, Na, K, Be, Mg, Ca, Sr, Ba and Eu and x represents the valence of M).

(i) Supported Metal Catalyst Prepared Using Conductive Mayenite Compound

The "conductive mayenite compound" used as a carrier of the supported metal catalyst is a mayenite compound containing conductive electrons. The mayenite compound refers to a composite oxide having a crystal structure of the same type as the crystal structure of the mineral mayenite itself, the mayenite rock, and the mineral mayenite crystal. The crystal of a mayenite compound is composed of cages with an inner diameter of about 0.4 nm that are linked in a three-dimensional manner with the walls shared with one another. Typically, a negative ion, such as $O^{2-}$, is contained inside each cage of the mayenite compound, and the negative ion can be replaced with a conductive electron through annealing. By increasing the annealing time, the conductive electron concentration in the mayenite compound is increased.

A representative composition of the conductive mayenite compound is represented by the formula $[Ca_{24}Al_{28}O_{64}]^{4+}(O^{2-})_{2-x}$ ($0<x\leq2$). From the viewpoint of the ammonia synthesis activity, the conductive electron concentration in the mayenite compound is preferably $10^{15}$ cm$^{-3}$ or more, more preferably $10^{16}$ cm$^{-3}$ or more, further preferably $10^{17}$ cm$^{-3}$ or more, and furthermore preferably $10^{18}$ cm$^{-3}$ or more. The upper limit of the conductive electron concentration is not particularly limited, and may typically be $2.2\times10^{21}$ cm$^{-3}$ or less, or $2.0\times10^{21}$ cm$^{-3}$ or less, for example. The conductive electron concentration in the mayenite compound can be measured, for example, by the method described in WO 2012/077658.

In the conductive mayenite compound, a part or all of Ca contained in the formula of the representative composition may be replaced with at least one typical metal element or transition metal element selected from the group consisting of Li, Na, K, Mg, Sr, Ba, Sc, Ti, V, Cr, Mn, Fe, Co, Ni, Cu, Ir, Ru, Rh, and Pt. In addition, a part or all of Al contained in the representative composition may be replaced with at least one typical metal element or transition metal element selected from the group consisting of B, Ga, C, Si, Fe, and Ge. Furthermore, a part or all of O contained in the formula of the representative composition may be replaced with at least one typical element or metal element selected from the group consisting of H, F, Cl, Br, and Au. The conductive mayenite compound can be prepared, for example, by a method described in WO 2012/077658.

The conductive mayenite compound may be an electride of a conductive mayenite compound. An example of the conductive mayenite compound is an electride of a mixed oxide of calcium and aluminum (electride of $12CaO\cdot7Al_2O_3$).

(ii) Supported Metal Catalyst of Two-Dimensional Electride Compound or Precursor Compound Thereof The "two-dimensional electride compound" used as a carrier of the supported metal catalyst refers to a layered compound in which electrons are present as anions between layers, in other words, an electride in which layers are connected via electrons present between the layers.

In the two-dimensional electride compound, electrons are present in a spatial gap as two-dimensionally delocalized anionic electrons. Thus, the electrons can quite smoothly move throughout the compound.

It was found in 2013 that $Ca_2N$ is a two-dimensional electride (K. Lee, S. W. Kim, Y. Toda, S. Matsuishi, and H. Hosono, "Nature", Vol. 494, pp. 336-341 (2013)). $Ca_2N$ is a layered compound in which an electron is bound as an anion between layers composed of $[Ca_2N]^+$, and can be obtained by heating $Ca_3N_2$ and metal Ca in vacuum. It is reported that $Ca_2N$ has a conductive electron concentration of $1.39 \times 10^{22}$ $cm^{-3}$ and a work function of 2.6 eV. Subsequently, A. Walsh and D. O. Scanlon reports the two-dimensional electride in Journal of Materials Chemistry C, Vol. 1, pp. 3525-3528 (2013). Furthermore, a nitride electride containing a nitride having a layered crystal structure and represented by an ionic formula $[AE_2N]^+e^-$ (AE is at least one element selected from Ca, Sr, and Ba) is reported (JP 2014-24712 A).

Examples of the two-dimensional electride compound that can be used as a carrier of a supported metal catalyst include at least one selected from the group consisting of a nitride electride represented by the formula $M^1{}_2N$ (wherein $M^1$ represents at least one selected from the group consisting of Ca, Sr, and Ba) and a carbide electride represented by the formula $M^2{}_2C$ (wherein $M^2$ represents at least one selected from the group consisting of Y, Sc, Gd, Tb, Dy, Ho, and Er). Note that a part of $M^1$ and $M^2$ may be replaced with at least one alkali metal element selected from the group consisting of Li, Na, K, Rb, and Cs.

A precursor compound of the two-dimensional electride compound may also be used as a carrier. For example, as a precursor of $Ca_2N$ which is a two-dimensional electride compound, $Ca_3N_2$ or a hydrogenated calcium nitride represented by the formula $Ca_xN_yH_z$ (1<x<11, 1<y<8, 0<z<4) can be used. As the hydrogenated calcium nitride (hereinafter "Ca—N—H compound"), $Ca_2NH$, CaNH, $Ca(NH_2)_2$, and the like are known. Precursor compounds of $Sr_2N$ or $Ba_2N$ are similar to the precursor compounds of $Ca_2N$.

Accordingly, the precursor compound of the two-dimensional electride compound is at least one selected from the group consisting of a nitride represented by the formula $M^1{}_3N_2$ and a compound represented by the formula $M^1{}_xN_yH_z$ (1<x<11, 1<y<8, 0<z<4). In the formulae, $M^1$ represents at least one selected from the group consisting of Ca, Sr, and Ba.

The two-dimensional electride compound may be prepared by a known method. For example, $Ca_2N$ can be obtained by mixing $Ca_3N_2$ and metal Ca and heating the mixture under a vacuum condition for a long time (for example, at a temperature as high as about 800° C. for about 100 hours).

When a metal having a catalytic activity for ammonia synthesis is supported on a two-dimensional electride compound or a precursor compound thereof to form a supported metal catalyst, the ammonia synthesis activity is dramatically increased to achieve a catalyst having significantly high performance that is stable even in a long-time reaction.

(iii) Supported Metal Catalyst Prepared Using Composite of Metal Oxide and Metal Amide As a carrier of the supported metal catalyst, a composite of a carrier substrate and a metal amide supported on the carrier substrate, the carrier substrate containing at least one metal oxide selected from $ZrO_2$, $TiO_2$, $CeO_2$, and MgO, the metal amide being represented by the formula $M(NH_2)_x$ (wherein M is at least one selected from Li, Na, K, Be, Mg, Ca, Sr, Ba, Yb, and Eu), is also suitably used.

For example, when $Ca(NH_2)_2$ is used as a metal amide, $Ca(NH_2)_2$ is converted to $Ca_2N$ or a Ca—N—H compound, such as $Ca_2NH$ or CaNH, under an ammonia synthesis condition, and cooperates with an active metal to increase the function as an active species. Thus, the supported metal catalyst containing the composite as a carrier can achieve a stable catalytic activity for a long time in ammonia synthesis.

As a carrier substrate, activated charcoal, graphite, a metal oxide, and the like can be used, and a carrier substrate having a basic to neutral surface, such as $ZrO_2$, $TiO_2$, $CeO_2$, and MgO, is preferred. A carrier substrate containing one or more thereof may be used. As the carrier substrate, either a powder or a molded carrier substrate can be used.

The amount of the metal amide supported in the composite is preferably 1 to 90% by mass, and more preferably 10 to 40% by mass.

From the viewpoint that the surface of the carrier substrate is sufficiently covered with the metal amide to achieve a desired catalytic activity, when the specific surface area of carrier substrate is taken as A ($m^2/g$) and the amount of the metal amide supported in the composite is taken as B (% by mass), the composite is preferably prepared so that B/A is preferably 0.07 or more, more preferably 0.1 or more, and further preferably 0.2 or more, 0.3 or more, or 0.4 or more. From the viewpoint of achieving a desired catalytic activity, the upper limit of B/A is preferably 2.3 or less, more preferably 2.0 or less, and further preferably 1.8 or less, 1.6 or less, or 1.5 or less.

<Active Metal Used in Supported Metal Catalyst>

The active metal for use in the supported metal catalyst of the above (i) to (iii) is not particularly limited as long as it is a metal that has a catalytic activity in ammonia synthesis by direct reaction of hydrogen and nitrogen. Examples thereof include at least one of metals of the group 6, 7, 8, or 9 in the periodic table or a compound of the metal. Examples of metals of the group 6 in the periodic table include Cr, Mo, and W. Examples of metals of the group 7 in the periodic table include Mn, Tc, and Re. Examples of metals of the group 8 in the periodic table include Fe, Ru, and Os. Examples of metals of the group 9 in the periodic table include Co, Rh, and Ir. From the viewpoint of the capability of synthesizing ammonia from nitrogen and hydrogen under a low-pressure condition, among the active metals, Ru is preferably used as an active metal in the supported metal catalyst of the above (i) to (iii).

From the viewpoint of the ammonia synthesis activity, the amount of the active metal supported in the supported metal catalyst based on 100 parts by mass of the carrier is preferably 0.01 parts by mass or more, more preferably 0.02 parts by mass or more, further preferably 0.03 parts by mass or more, 0.05 parts by mass or more, 0.1 parts by mass or more, 0.3 parts by mass or more, 0.5 parts by mass or more, or 1 part by mass or more. From the viewpoint of suppressing sintering of active metal particles in the ammonia synthesis reaction to maintain a desired ammonia synthesis activity, the upper limit of the amount of the active metal supported is preferably 30 parts by mass or less, more preferably 20 parts by mass or less, further preferably 15 parts by mass or less or 10 parts by mass or less. Note that the upper limit and the lower limit can be combined in any manner.

The specific surface area of the supported metal catalyst is not particularly limited, and is preferably 0.1 to 250 m$^2$/g and more preferably 0.5 to 200 m$^2$/g. The specific surface area of the supported metal catalyst can be measured, for example, by a BET adsorption method.

The supported metal catalyst can be prepared by a known method using the carrier and the active metal. For example, a supported metal catalyst containing a conductive mayenite compound as a carrier can be prepared by a method described in WO 2012/077658.

Note that the ammonia synthesis catalyst used in the ammonia synthesis reactors 11 and 12 is not limited to the supported metal catalysts of the above (i) to (iii) as long as it is an ammonia synthesis catalyst that is capable of synthesizing ammonia from nitrogen and hydrogen at a reaction pressure of 10 MPa or less. For example, a supported ruthenium catalyst prepared using an oxide, such as silicon oxide (silica), zinc oxide, aluminum oxide (alumina), magnesium oxide (magnesia), indium oxide, calcium oxide, zirconium oxide (zirconia), titanium oxide (titania), boron oxide, hafnium oxide, barium oxide, cerium oxide (ceria), or zeolite; a nitride, such as silicon nitride, aluminum nitride, boron nitride, or magnesium nitride; activated charcoal; or the like as a carrier can also be used.

In addition, a supported metal catalyst prepared using a transition metal-supporting intermetallic compound obtained by supporting a transition metal on an intermetallic compound represented by the general formula $A_5X_3$ (A represents a rare earth element and X represents Si or Ge) as described in WO 2017/111028 can be used as the ammonia synthesis catalyst used in the ammonia synthesis reactors 11 and 12. Among them, from the viewpoint of a high ammonia synthesis activity, a supported metal catalyst prepared using a transition metal-supporting intermetallic compound obtained by supporting a transition metal on $Y_5Si_3$ is more preferred.

A supported metal catalyst prepared using a three-dimensional intermetallic compound LaCoSi as described in Nature Catalysis, Vol. 1, March 2018, pp. 178-185 can also be used as the ammonia synthesis catalyst used in the ammonia synthesis reactors 11 and 12.

In addition, a supported metal catalyst prepared using a mayenite compound produced by a hydrothermal synthesis method as described in WO 2018/030394 can also be used as the ammonia synthesis catalyst used in the ammonia synthesis reactors 11 and 12.

Furthermore, a catalyst containing a Laves phase intermetallic compound that has a composition represented by the general formula $ARu_2$ (A represents one or more elements selected from Lanthanoid elements except for Y, Sc, or Ce) as an catalytically active component as described in WO 2017/047709 can also be used as the ammonia synthesis catalyst used in the ammonia synthesis reactors 11 and 12. Among them, from the viewpoint of the availability and the low cost, a catalyst containing $YRu_2$ as a catalytically active component is preferred.

In addition, a supported metal catalyst prepared using an intermetallic compound LaScSi as described in Advanced Materials, 29, 1700924-1-7 (2017) can also be used as the ammonia synthesis catalyst used in the ammonia synthesis reactors 11 and 12.

Furthermore, a supported metal catalyst prepared using an electride represented by the general formula $LnH_2$ (Ln represents La, Ce, Ca, or Y) as described in Inorganic Chemistry, Vol. 55, pp. 8833-8838 (2016) can also be used as the ammonia synthesis catalyst used in the ammonia synthesis reactors 11 and 12.

In addition, an oxide-supported catalyst (Ru/$La_{0.5}Ce_{0.5}O_{1.75}$) in which ruthenium is supported as described in Chemical Science, Vol. 9, pp. 2230-2237 (2018) can also be used as the ammonia synthesis catalyst used in the ammonia synthesis reactors 11 and 12.

Furthermore, a catalyst (Ru/$Pr_2O_3$) in which ruthenium is supported on praseodymium oxide as described in Chemical Science, Vol. 8, pp. 674-679 (2017) can also be used as the ammonia synthesis catalyst used in the ammonia synthesis reactors 11 and 12.

In addition, an iron catalyst of a magnetite structure as described in Industrial & Engineering Chemistry, Vol. 18, pp. 1307-1309 (1926) can also be used as the ammonia synthesis catalyst used in the ammonia synthesis reactors 11 and 12.

Furthermore, an iron catalyst of a Wustite structure as described in Applied Catalysis A, Vol. 142, pp. 209 (1996) can also be used as the ammonia synthesis catalyst used in the ammonia synthesis reactors 11 and 12.

In addition, a catalyst (Ru/Celite) in which ruthenium is supported on Celite (registered tradename) as described in Bulletin of the Chemical Society of Japan, Vol. 44, pp. 3216 (1971) can also be used as the ammonia synthesis catalyst used in the ammonia synthesis reactors 11 and 12.

Furthermore, a catalyst (Ru/graphite) in which ruthenium is supported on graphite as described in WO 84/03642 can also be used as the ammonia synthesis catalyst used in the ammonia synthesis reactors 11 and 12.

In addition, a catalyst containing a cobalt-molybdenum composite nitride having cesium added thereto as described in Journal of Catalysis, Vol. 208, pp. 180-186 (2002) can also be used as the ammonia synthesis catalyst used in the ammonia synthesis reactors 11 and 12.

Furthermore, a catalyst prepared using cobalt having barium added thereto as a supported metal and carbon as a carrier as described in ChemCatChem, Vol. 4, pp. 2836-2839 (2015) can also be used as the ammonia synthesis catalyst used in the ammonia synthesis reactors 11 and 12.

In addition, a catalyst prepared using cobalt as a supported metal and using cerium oxide as a carrier as described in RSC Advances, Vol. 4, pp. 38093-38102 (2014) can also be used as the ammonia synthesis catalyst used in the ammonia synthesis reactors 11 and 12.

Furthermore, an ammonia synthesis catalyst in which a carrier contains a perovskite oxide semiconductor as described in JP 2017-148810 A can also be used as the ammonia synthesis catalyst used in the ammonia synthesis reactors 11 and 12.

In addition, a supported metal catalyst containing a metal-supporting body in which a transition metal is supported on a cyanamide compound represented by the following general formula (1) as described in WO 2018/169076 can also be used as the ammonia synthesis catalyst used in the ammonia synthesis reactors 11 and 12:

$$MCN_2 \quad (1)$$

(wherein M represents an element of the group II in the periodic table).

M is specifically at least one element selected from Be, Mg, Ca, Sr, and Ba, and among them, is preferably at least one element selected from Mg, Ca, Sr, and Ba. M is more preferably at least one element selected from Ca, Sr, and Ba since such a compound is not thermally decomposed and is stable even in a high temperature reaction condition. M is further preferably Ca since the atomic number is small so that the area per unit weight (specific surface area) is easily increased.

In other words, the cyanamide compound is specifically a salt of a cyanamide ($CN_2H_2$) and an element of the group II in the periodic table.

In addition, a supported metal catalyst containing a transition metal-supporting body in which a transition metal is supported on an electron or hydride ion absorption-desorption material prepared using a lanthanoid oxyhydride represented by the following general formula (2) as described in WO 2019/176987 can also be used as the ammonia synthesis catalyst used in the ammonia synthesis reactors 11 and 12:

$$Ln(HO) \qquad (2)$$

(wherein, Ln represents a lanthanoid element).

Ln is specifically at least one element selected from Gd, Sm, Pr, Ce, Er, Dy, Ho, La, and Nd.

The transition metal is, for example, at least one metal selected from the group consisting of Ru, Fe, Co, Cr, and Mn.

Among the above catalysts, from the viewpoint of exhibiting a high catalytic activity even at a low temperature, the ammonia synthesis catalyst used in the ammonia synthesis reactors 11 and 12 is preferably a supported metal catalyst prepared using a conductive mayenite compound, a supported metal catalyst prepared using a two-dimensional electride compound or a precursor compound thereof as a carrier, a supported metal catalyst prepared using a composite of a carrier substrate containing a metal oxide and a metal amide as a carrier, a supported metal catalyst prepared using a transition metal-supporting intermetallic compound obtained by supporting a transition metal on $Y_5Si_3$, a supported metal catalyst prepared using a three-dimensional intermetallic compound LaCoSi, a supported metal catalyst prepared using a mayenite compound produced by a hydrothermal synthesis method, a catalyst containing $YRu_2$ as a catalytically active component, a supported metal catalyst prepared using an intermetallic compound LaScSi, a supported metal catalyst prepared using an electride represented by the general formula $LnH_2$ (Ln represents La, Ce, Ca, or Y), an iron catalyst of a Wustite structure, and a supported metal catalyst containing a metal supported body in which a transition metal is supported on a cyanamide compound and on a lanthanoid oxyhydride represented by the general formula Ln(HO) (Ln represents Gd, Sm, Pr, Ce, Er, Dy, Ho, La, or Nd).

In the ammonia synthesis reactors 11 and 12, one of the supported metal catalysts may be used alone or two or more thereof may be used in combination. When two or more supported metal catalysts are used, the two or more supported metal catalysts may be mixed according to the reaction system, the supported metal catalysts may be laminated so that different layers are formed from type to type, or reaction tubes filled with different supported metal catalysts from type to type may be combined. In addition, the supported metal catalyst used in the ammonia synthesis reactor 11 and the supported metal catalyst used in the ammonia synthesis reactor 12 may be the same as or may be different from each other.

<Activation Energy of Ammonia Synthesis Reaction when Using Ammonia Synthesis Catalyst>

From the viewpoint of capability of synthesizing ammonia from nitrogen and hydrogen at a reaction pressure of 10 MPa or less, an ammonia synthesis catalyst that provides an apparent activation energy of the ammonia synthesis reaction of preferably 80 kJ/mol or less, more preferably 60 kJ/mol or less is preferably used in the ammonia synthesis reactors 11 and 12. Note that the apparent activation energy of the ammonia synthesis reaction can be calculated from the slope of a line obtained by plotting measurement results on an x-y plane with the ammonia production rate in the ammonia synthesis reaction on the y-axis and the reciprocal of the reaction temperature therein on the x-axis.

<Reaction Pressure of Ammonia Synthesis>

The ammonia synthesis reaction pressure is 10 MPa or less, preferably 7 MPa or less, more preferably 5 MPa or less, and further preferably 3 MPa or less. An ammonia synthesis reaction pressure larger than 10 MPa leads to an increased energy required for compressing the raw material gases of the ammonia synthesis.

The lower the ammonia synthesis reaction pressure is, the lower the energy required for compressing the raw material gases of the ammonia synthesis. Thus, the lower limit of the range of the ammonia synthesis reaction pressure is not particularly limited as long as ammonia can be synthesized while securing the ability to produce ammonia. However, as the reaction pressure is higher, the ammonia synthesis reaction is more promoted. Accordingly, the ammonia synthesis reaction pressure is preferably 500 kPa or more. Note that the reaction pressure is a gage pressure (the same applies hereinafter). The upper limit and the lower limit may be combined in any manner.

<Reaction Temperature of Ammonia Synthesis>

From the viewpoints of the chemical equilibrium in the ammonia synthesis reaction and the easiness of the ammonia synthesis, the ammonia synthesis reaction temperature is preferably 650° C. or lower, more preferably 600° C. or lower, further preferably 550° C. or lower, and particularly preferably 530° C. or lower. In addition, from the viewpoint of the reaction rate of the ammonia synthesis reaction, the ammonia synthesis reaction temperature preferably 100° C. or higher, more preferably 200° C. or higher, further preferably 250° C. or higher, and particularly preferably 270° C. or higher. Note that the upper limit and the lower limit may be combined in any manner. The ammonia synthesis reaction temperature is a temperature of the ammonia synthesis reaction that occurs inside the ammonia synthesis reactor and is different from the temperature of the inlet gas of the ammonia synthesis reactor.

<Adjustment of Ammonia Synthesis Temperature in Ammonia Synthesis Reactor>

Ammonia is synthesized using an ammonia synthesis catalyst in the ammonia synthesis reactors 11 and 12. Thus, it is required to appropriately adjust the temperature of the ammonia synthesis catalyst in the ammonia synthesis reactors 11 and 12. The method for adjusting the temperature of the catalyst may be selected, for example, from four choices in which either one of (i) a catalyst interlayer cooling system and (ii) a catalyst intralayer cooling system and either one of (iii) a cooled gas mixing system (gas quenching system) and (iv) a heat exchange system are combined.

The system (i) is a system in which catalyst layers are divided into multiple stages and the reaction gas heated in a catalyst layer is cooled and then fed to the next catalyst layer. The system (ii) is a system in which the reaction gas is cooled in a catalyst layer. As a method for cooling the reaction gas, there are the system (iii) in which a cold raw material gas is directly mixed with the reaction gas and the system (iv) in which a cooling tube is placed between layers to cool the reaction gas.

<Arrangement of Ammonia Synthesis Reactors>

The ammonia synthesis reactors 11 and 12 are preferably connected in series. Thus, the ammonia synthesis reactor 12 can synthesize ammonia using the ammonia-containing gas discharged from the ammonia synthesis reactor 11. As a result, the ammonia gas concentration in the ammonia-containing gas discharged from the ammonia synthesis reaction unit 10 can be further increased. Then, the amount of the liquefied ammonia collected, which is separated by the gas-liquid separator 30, can be increased. In addition, the ammonia gas concentration in the circulated gas supplied to the ammonia synthesis reaction unit 10 can also be increased.

<Temperature of Inlet Gas of Ammonia Synthesis Reactors>

From the viewpoint that the ammonia synthesis reaction is an exothermic reaction and the viewpoint of adjusting the ammonia synthesis reaction temperature within the above range of the reaction temperature, the inlet gas temperature in each of the ammonia synthesis reactors 11 and 12 is preferably 100 to 600° C., more preferably 200 to 500° C., and further preferably 250 to 450° C. Note that the inlet gas temperature is a temperature of the gas at an inlet (not shown) of the ammonia synthesis reactors 11 and 12.

<Ratio of Hydrogen Gas to Nitrogen Gas in Inlet Gas of Ammonia Synthesis Reactors>

From the viewpoint of capability of efficiently synthesizing ammonia, the ratio of hydrogen gas to nitrogen gas ($H_2/N_2$: molar ratio) in the inlet gas of each of ammonia synthesis reactors is preferably 0.5 to 4.0, more preferably 1.5 to 3.3, and further preferably 1.5 to 3.0.

The ammonia synthesis reaction unit 10 may further include between the ammonia synthesis reactors 11 and 12 a heat exchanger 13 that cools the outlet gas of the ammonia synthesis reactor 11 so that the inlet gas temperature of the ammonia synthesis reactor 12 can be adjusted within the above range. Thus, the inlet gas temperature of the ammonia synthesis reactor 12 can be more easily adjusted within the above range and in addition, the heat generated by the ammonia synthesis reaction in the ammonia synthesis reactor 11 can be collected and efficiently used. The heat exchanger 13 is not particularly limited as long as another heat transfer medium can be heated with the heat of the outlet gas of the ammonia synthesis reactor 11. For example, the heat exchanger 13 may heat the air fed by a blower with the heat of the outlet gas of the ammonia synthesis reactor 11 or may heat water to generate a high pressure steam.

<Ammonia Gas Concentration in Circulated Gas Supplied to Ammonia Synthesis Reaction Unit>

In the ammonia cooler 20, by increasing the ammonia gas concentration in the circulated gas supplied to the ammonia synthesis reaction unit 10, the cooling temperature in cooling the ammonia-containing gas can be increased. In other words, when the ammonia gas concentration in the circulated gas supplied to the ammonia synthesis reaction unit 10 is higher, the cooling temperature in cooling the ammonia-containing gas in the gas-liquid separator 30 can be higher. From this point of view, the ammonia gas concentration of the circulated gas supplied to the ammonia synthesis reaction unit is 3% by volume or more, preferably 5% by volume or more, more preferably 6% by volume or more, and further preferably 7% by volume or more. When the ammonia gas concentration of the circulated gas supplied to the ammonia synthesis reaction unit is less than 3% by volume, the cooling temperature in cooling the ammonia-containing gas is to be lower for liquefying ammonia in the ammonia-containing gas, and the energy required in cooling the ammonia-containing gas is increased.

When the ammonia gas concentration in the circulated gas supplied to the ammonia synthesis reaction unit 10 is too high, the amount of the liquefied ammonia collected from the ammonia-containing gas is reduced. Thus, from the viewpoint of securing the amount of the liquefied ammonia collected from the ammonia-containing gas, the ammonia gas concentration in the circulated gas supplied to the ammonia synthesis reaction unit is preferably 35% by volume or less, and more preferably 25% by volume or less. Note that the upper limit and the lower limit may be combined in any manner.

Note that, when the circulated gas having added thereto the nitrogen gas and hydrogen gas supplied by the ammonia synthesizing gas supplying unit 40 is supplied to the ammonia synthesis reaction unit 10, the ammonia gas concentration in the circulated gas supplied to the ammonia synthesis reaction unit 10 is the ammonia gas concentration in the circulated gas having added thereto the nitrogen gas and hydrogen gas supplied by the ammonia synthesizing gas supplying unit 40.

In the ammonia synthesis system 1 in an embodiment of the present invention, the ammonia synthesis reaction pressure is in the above range and the ammonia gas concentration in the circulated gas supplied to the ammonia synthesis reaction unit 10 is in the above range, whereby the energy required for producing ammonia can be reduced while securing the ability to produce ammonia.

If specifically explained, with an ammonia synthesis reaction pressure in the above range, the energy required for increasing the ammonia synthesis reaction pressure can be reduced. However, in order to secure the ability to produce ammonia, the cooling temperature of the ammonia-containing gas is to be decreased, and thus, the energy required for cooling the ammonia gas is even increased. However, with an ammonia gas concentration in the circulated gas supplied to the ammonia synthesis reaction unit in the above range, the decrease in the cooling temperature of the ammonia-containing gas due to the ammonia synthesis reaction pressure in the above range can be suppressed. As a result, an increase in the energy required for cooling the ammonia-containing gas due to the ammonia synthesis reaction pressure in the above range can be suppressed. Then, since the energy required for increasing the ammonia synthesis reaction pressure is larger than the energy required for cooling the ammonia gas, as a result, the energy required for producing ammonia can be reduced.

<Ammonia Synthesis in Ammonia Synthesis Reaction Unit>

Ammonia synthesis in the ammonia synthesis reaction unit 10 will be described with reference to FIG. 2. For example, it is assumed that a circulated gas having an ammonia gas concentration of 4% by volume and a temperature of 300° C. is supplied to the ammonia synthesis reactor 11 (point A). In the ammonia synthesis reactor 11, an ammonia synthesis reaction proceeds under a condition of a reaction pressure of 3 MPa to increase the ammonia concentration in the reaction gas. Since the ammonia synthesis reaction is an exothermal reaction, the reaction gas temperature is also increased. Thus, the ammonia concentration of the outlet gas of the ammonia synthesis reactor 11 is, for example, 9% by volume and the outlet gas temperature is, for example, 400° C. (point B). The reaction gas discharged from the outlet of the ammonia synthesis reactor 11 is supplied to the ammonia synthesis reactor 12. In the reaction gas discharged from the outlet of the ammonia synthesis reactor 11, the temperature is decreased while the ammonia concentration is maintained. Then, when the reaction gas reaches the inlet of the ammonia synthesis reactor 12, the reaction gas temperature is decreased, for example, to 300° C. (point C). In the ammonia synthesis reactor 12, the ammonia synthesis reaction proceeds under a condition of a reaction pressure of 3 MPa to increase the temperature of the reaction gas supplied to the ammonia synthesis reactor 12 again while further increasing the ammonia concentration in the reaction gas. Thus, the ammonia concentration of the reaction gas discharged from the outlet of the ammonia synthesis reactor 12 is, for example, 13% by volume, and the reaction gas temperature is a temperature lower than the temperature (point B) of the outlet gas of the ammonia synthesis reactor 11, for example, 350° C. (point D). In this manner, for example, an ammonia-containing gas having an ammonia gas concentration of 13% by volume is synthesized from a circulated gas having an ammonia gas concentration of 4% by volume.

Figure 2:
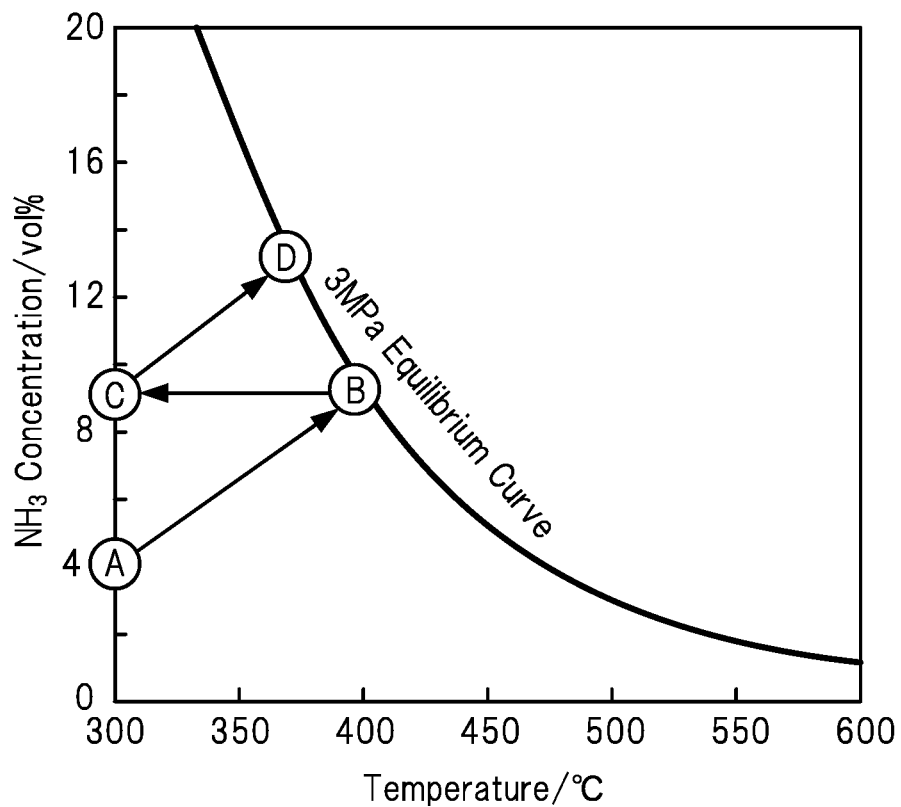
FIG. 2 is a graph for explaining ammonia synthesis in an ammonia synthesis reaction unit in the ammonia synthesis system according to an embodiment of the present invention.

In an ammonia synthesis reaction, as shown in the equilibrium curve of 3 MPa of FIG. 2, from the viewpoint of the chemical equilibrium, a lower reaction temperature leads to a higher ammonia concentration. On the other hand, from the viewpoint of the reaction rate, a lower reaction temperature leads to a longer time for the ammonia synthesis reaction to reach the chemical equilibrium. Thus, from the viewpoint of the reaction rate, a higher reaction temperature results in a higher ammonia concentration.

In the ammonia synthesis reaction unit 10 in the ammonia synthesis system 1 according to an embodiment of the present invention, the ammonia synthesis reactor 11 performs an ammonia synthesis reaction at a higher reaction temperature from the viewpoint of the reaction rate, and the ammonia synthesis reactor 12 performs an ammonia synthesis reaction at a lower reaction temperature from the viewpoint of the chemical equilibrium. Accordingly, the ammonia gas concentration in the ammonia-containing gas discharged from the ammonia synthesis reaction unit 10 can be higher.

(Ammonia Cooler)

As described above, the ammonia cooler 20 cools the ammonia-containing gas which is discharged from the ammonia synthesis reaction unit 10 and which contains ammonia gas synthesized by the ammonia synthesis reaction unit 10. Thus, the ammonia gas synthesized by the ammonia synthesis reaction unit 10 can be liquefied and the liquefied ammonia can be collected by the gas-liquid separator 30. The ammonia cooler 20 cools the ammonia-containing gas, for example, through heat exchange by bringing the ammonia-containing gas into contact with a solid wall (mainly a metal wall) cooled with a heat transfer medium.

<Cooling Temperature>

From the viewpoint that it is such a temperature that the ammonia gas can be liquefied even with a lower pressure of the ammonia-containing gas due to a relatively higher ammonia gas concentration in the circulated gas and from the viewpoint of the applicability of a refrigerant that is generally used in a factory, the cooling temperature in cooling the ammonia-containing gas in the ammonia cooler 20 is preferably −40 to 15° C. Furthermore, from the viewpoint of capability of further reducing the pressure in liquefying the ammonia gas, the cooling temperature is more preferably −30 to 5° C.

<Liquid Used for Cooling Ammonia-Containing Gas>

The ammonia cooler 20 preferably cools the ammonia-containing gas by heat exchange between a liquid having a boiling point at 1 atm of −33.0° C. or higher and the ammonia-containing gas. Thus, the reduction in the cooling ability of the ammonia cooler 20 due to vaporization of the liquid used as a heat transfer medium in cooling the ammonia-containing gas can be suppressed. From the viewpoint of capability of efficiently cooling the ammonia-containing gas, the liquid used for cooling the ammonia-containing gas is preferably, for example, an anti-freezing fluid, and more preferably an alcohol-based brine containing an alcohol, such as ethylene glycol, propylene glycol, ethanol, or methanol.

(Gas-Liquid Separator)

As described above, the gas-liquid separator 30 separates the liquefied ammonia produced from the ammonia-containing gas cooled by the ammonia cooler 20 from the circulated gas which contains unreacted nitrogen gas, unreacted hydrogen gas, and ammonia gas. Specifically, the gas-liquid separator 30 is a device that separates and removes the liquefied ammonia associated with the circulated gas from the circulated gas. Examples of the gas-liquid separator 30 include a collision-type gas-liquid separator using a folded plate, a louver, or the like, a cyclone-type gas-liquid separator, a baffle-type gas-liquid separator, a bubble cap column, a packed column, and a wire mesh-type gas-liquid separator.

(Ammonia Synthesizing Gas Supplying Unit)

As described above, the ammonia synthesizing gas supplying unit 40 supplies nitrogen gas and hydrogen gas to be added to the circulated gas. Thus, nitrogen gas and hydrogen gas consumed by the ammonia synthesis reaction can be replenished into the circulated gas.

<Nitrogen Gas>

Nitrogen supplied by the ammonia synthesizing gas supplying unit 40 may be prepared by separating nitrogen from the air using a nitrogen separation membrane or a cryogenic separation process. When hydrogen is alternatively prepared using a partial oxidization reaction of a hydrocarbon, nitrogen in the air used as an oxygen source may be used. Alternatively, the ammonia synthesizing gas supplying unit 40 can supply nitrogen from a nitrogen cylinder (including a nitrogen cylinder bundle, the same applies hereinafter) or a nitrogen tank (including a movable tank, such as nitrogen self-loader, the same applies hereinafter).

<Hydrogen Gas>

Hydrogen supplied by the ammonia synthesizing gas supplying unit 40 can be prepared by a well-known method, for example, (i) a method in which hydrocarbon (for example, coal, petroleum, natural gas, and biomass) is converted into a gas containing CO and $H_2$ by a steam reforming reaction, a partial oxidation reaction, or a combination thereof, followed by a CO shift reaction and a decarbonation treatment, (ii) a method in which water is subjected to electrolysis, or (iii) a method in which water is decomposed using a photocatalyst. Alternatively, the ammonia synthesizing gas supplying unit 40 may supply hydrogen from a hydrogen cylinder (including hydrogen cylinder bundle, the same applies hereinafter) or a hydrogen tank (including a movable tank, such as a hydrogen self-loader, the same applies hereinafter).

Note that the ammonia synthesizing gas supplying unit 40 may further include a raw material gas production device that produces at least one of nitrogen gas and hydrogen gas. As the raw material gas production device, as described above, a known device may be used. Alternatively, the ammonia synthesizing gas supplying unit 40 may include a nitrogen cylinder or nitrogen tank for supplying nitrogen and may include a hydrogen cylinder or hydrogen tank for supplying hydrogen.

(Ammonia Synthesizing Gas Compressor and Circulated Gas Compressor)

As described above, the ammonia synthesis system 1 in an embodiment of the present invention may further include the ammonia synthesizing gas compressor 50 that compresses the nitrogen gas and hydrogen gas supplied by the ammonia synthesizing gas supplying unit 40 and the circulated gas compressor 60 that compresses the circulated gas separated by the gas-liquid separator 30. Thus, the reaction pressure in the ammonia synthesis and the pressure of the ammonia-containing gas in cooling the ammonia-containing gas can be further appropriately controlled. When the ammonia synthesis system 1 further includes the ammonia synthesizing gas compressor 50, the amount of nitrogen gas and hydrogen gas added to the circulated gas can further be appropriately controlled. When the ammonia synthesis system 1 further includes the circulated gas compressor 60, the circulated gas separated by the gas-liquid separator 30 can be recirculated at an economically appropriate space velocity. Note that the ammonia synthesizing gas compressor 50 may compress each of nitrogen gas and hydrogen gas, or may compress a mixed gas obtained by mixing nitrogen gas and hydrogen gas.

MODIFIED EXAMPLES

The ammonia synthesis system 1 according to an embodiment of the present invention can be modified as follows.

Modified Example 1

In the ammonia synthesis system 1 according to an embodiment of the present invention, the number of the ammonia synthesizers 11 and 12 in the ammonia synthesis reaction unit 10 was two. However, the number of the ammonia synthesizers in the ammonia synthesis reaction unit is not limited to two, and may be one or may be three or more. However, based on the balance between the ammonia concentration in the ammonia-containing gas that can be increased by increasing the number of the ammonia synthesizers and the production cost and operation cost of the ammonia synthesis system 1 that are increased by increasing the number of the ammonia synthesizers, the number of the ammonia synthesizers in the ammonia synthesis reaction unit 10 is preferably 2 to 5, more preferably 2 to 4, and further preferably 2 or 3.

Modified Example 2

In the ammonia synthesis system 1 according to an embodiment of the present invention, the outlet gas of the ammonia synthesizer 11 in the ammonia synthesis reaction unit 10 was cooled using the heat exchanger 13. However, the method for cooling the outlet gas of the ammonia synthesizer 11 is not limited to cooling by the heat exchanger 13.

For example, when the gas is naturally cooled while the gas is transferred from the ammonia synthesizer 11 to the ammonia synthesizer 12, no cooling means may be provided between the ammonia synthesizer 11 and the ammonia synthesizer 12.

Figure 3:
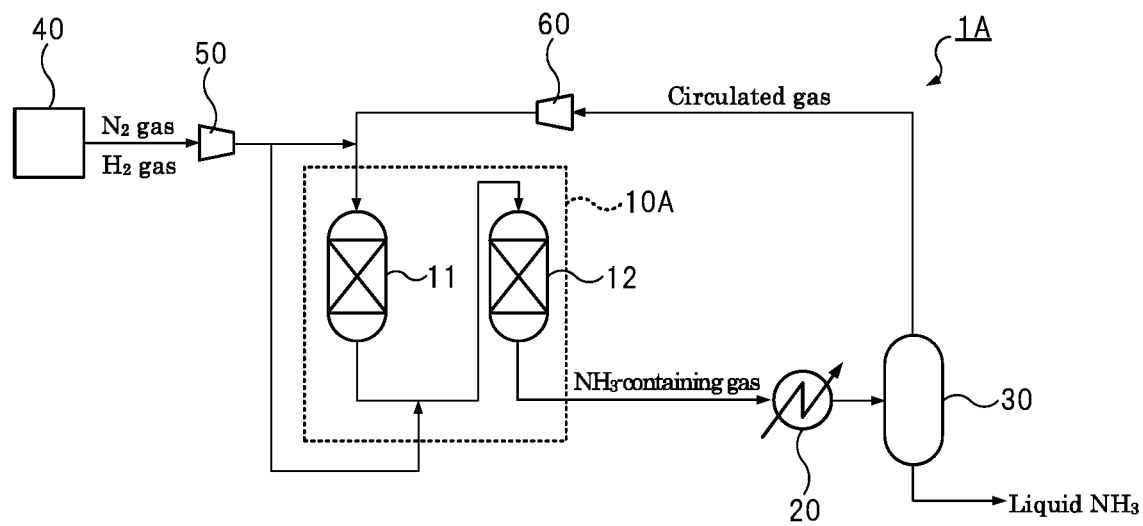
FIG. 3 is a schematic view illustrating a modified example of the ammonia synthesis system according to an embodiment of the present invention.

Alternatively, like an ammonia synthesis system 1A shown in FIG. 3, the outlet gas of the ammonia synthesizer 11 may be cooled by using the nitrogen gas and hydrogen gas supplied by the ammonia synthesizing gas supplying unit 40 as a quenching gas.

Figure 4:
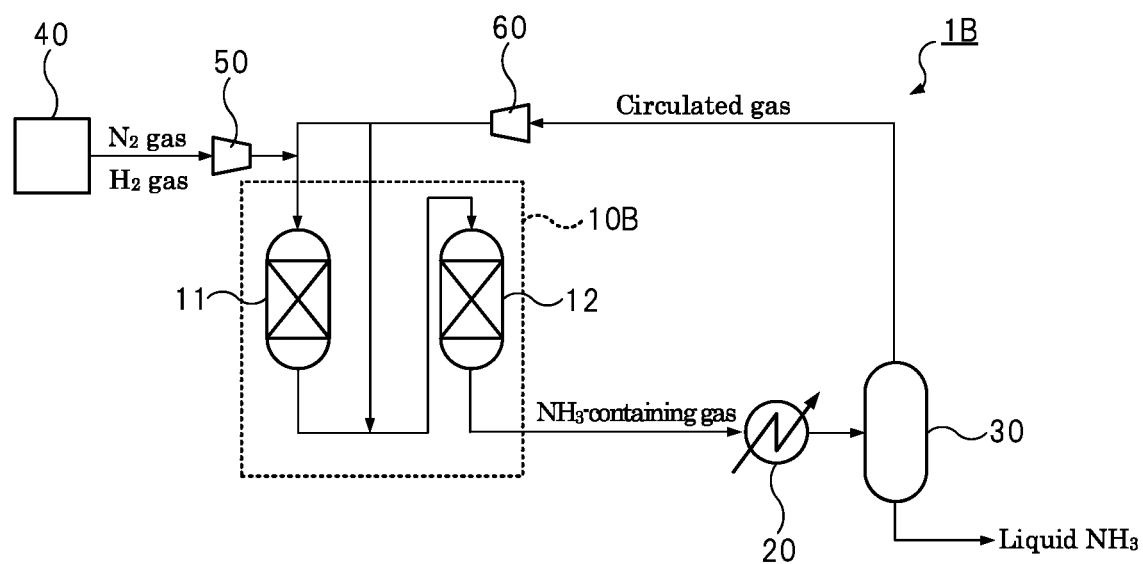
FIG. 4 is a schematic view illustrating a modified example of the ammonia synthesis system according to an embodiment of the present invention.

Alternatively, like an ammonia synthesis system 1B shown in FIG. 4, the outlet gas of the ammonia synthesizer 11 may be cooled by using the circulated gas as a quenching gas.

Figure 5:
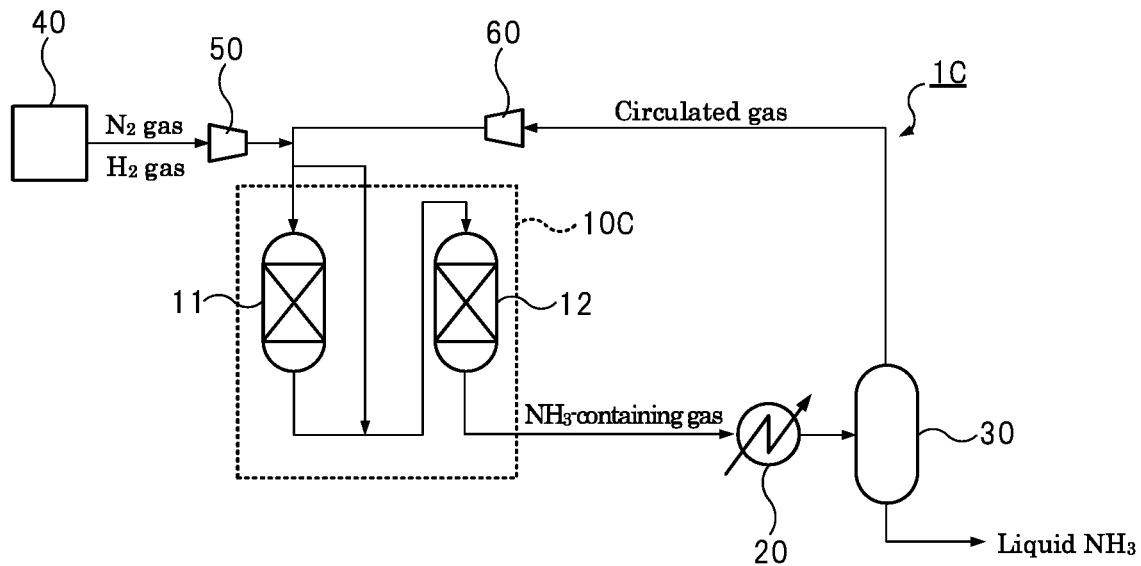
FIG. 5 is a schematic view illustrating a modified example of the ammonia synthesis system according to an embodiment of the present invention.

Alternatively, like an ammonia synthesis system 1C shown in FIG. 5, the outlet gas of the ammonia synthesizer 11 may be cooled by using the circulated gas having added thereto the nitrogen gas and hydrogen gas supplied from the ammonia synthesizing gas supplying unit 40 as a quenching gas.

Figure 6:
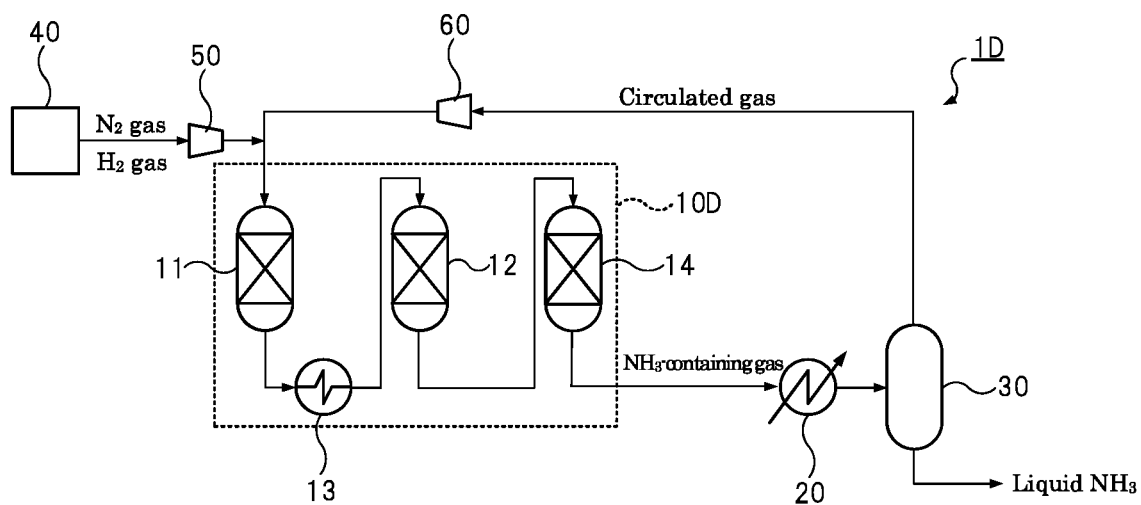
FIG. 6 is a schematic view illustrating a modified example of the ammonia synthesis system according to an embodiment of the present invention.

Note that, when the ammonia synthesis reaction unit includes two or more ammonia synthesizers, the position at which the cooling means is provided is not particularly limited as long as it is between the two or more ammonia synthesis reactors. For example, like an ammonia synthesis system 1D shown in FIG. 6, when an ammonia synthesis reaction unit 10D includes three ammonia synthesizers 11, 12, and 14, the heat exchanger 13 may be provided between the ammonia synthesizer 11 and the ammonia synthesizer 12 with no heat exchanger provided between the ammonia synthesizer 12 and the ammonia synthesizer 14.

Modified Example 3

Figure 7:
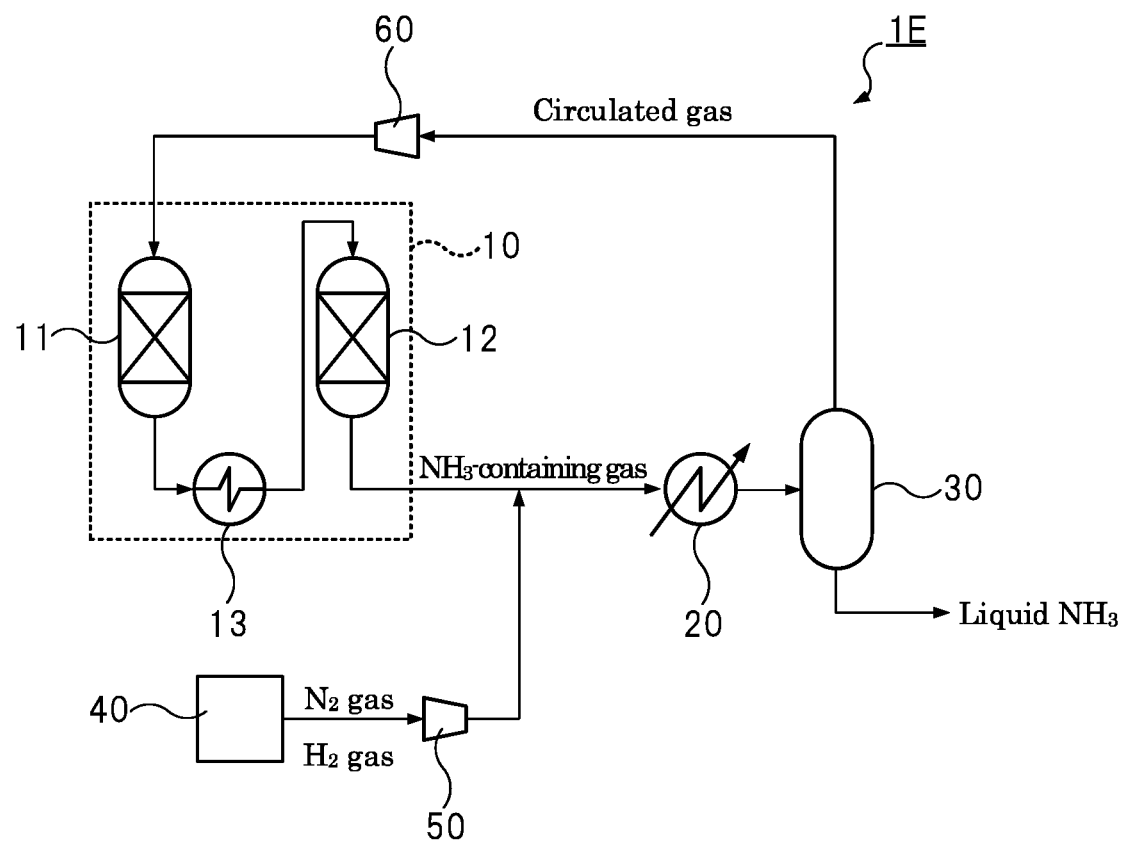
FIG. 7 is a schematic view illustrating a modified example of the ammonia synthesis system according to an embodiment of the present invention.

In the ammonia synthesis system 1 according to an embodiment of the present invention, the nitrogen gas and hydrogen gas supplied by the ammonia synthesizing gas supplying unit 40 were added to the circulated gas. However, like an ammonia synthesis system 1E shown in FIG. 7, the nitrogen gas and hydrogen gas supplied by the ammonia synthesizing gas supplying unit 40 may be added to the ammonia-containing gas. Thus, moisture and a miner amount of carbon dioxide contained in the nitrogen gas and hydrogen gas supplied by the ammonia synthesizing gas supplying unit 40 are transferred into the liquefied ammonia separated by the gas-liquid separator 30. Then, the moisture and carbon dioxide contained in the nitrogen gas and hydrogen gas supplied by the ammonia synthesizing gas supplying unit 40 do not remain in the circulated gas supplied to the ammonia synthesis reaction unit 10. Accordingly, the moisture and carbon dioxide which are catalyst poisons can be removed from the gas used for the ammonia synthesis prior to the ammonia synthesis.

Note that the flow rate(s) of the nitrogen gas and hydrogen gas supplied by the ammonia synthesizing gas supplying unit 40 is(are) generally smaller than the flow rate of the ammonia-containing gas. Thus, even when the nitrogen gas and hydrogen gas supplied by the ammonia synthesizing gas supplying unit 40 are added to the ammonia-containing gas, the ammonia gas concentration in the ammonia-containing gas is not largely decreased.

Furthermore, Modified Example 3 may be combined with Modified Example 2.

Figure 8:
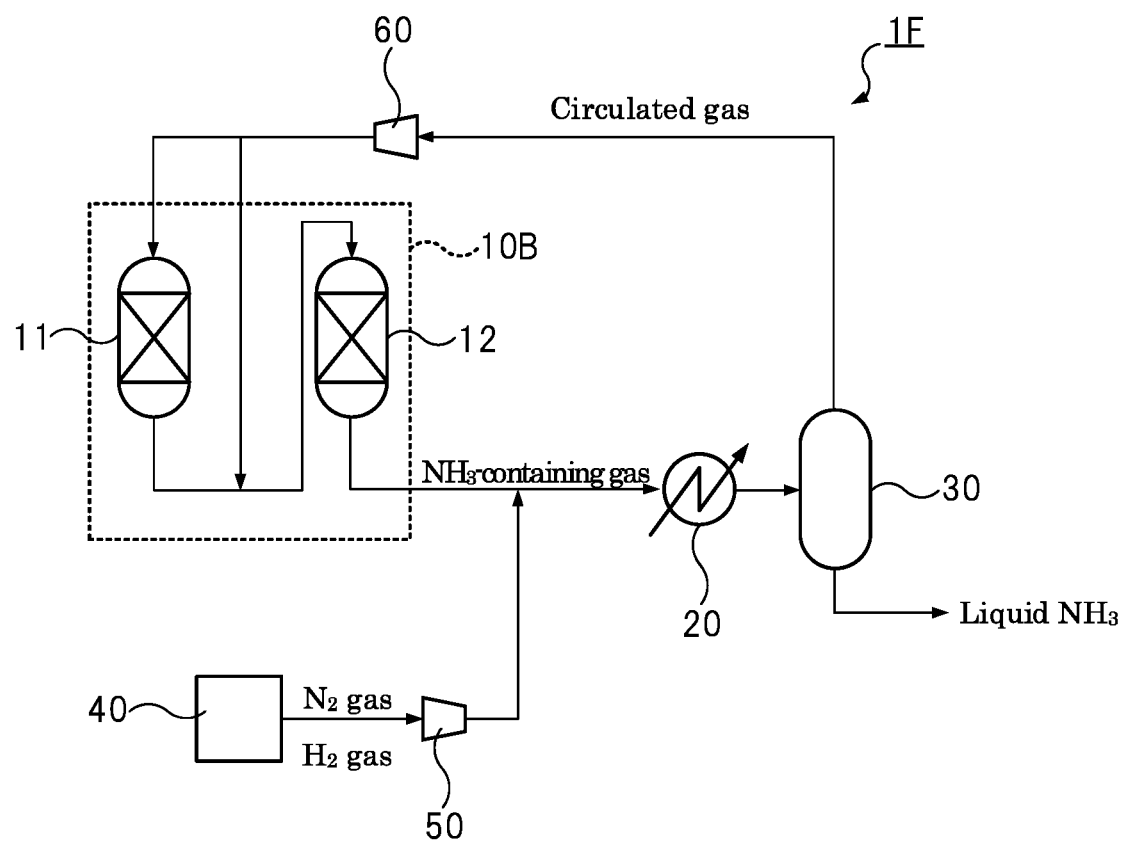
FIG. 8 is a schematic view illustrating a modified example of the ammonia synthesis system according to an embodiment of the present invention.

For example, like an ammonia synthesis system 1F shown in FIG. 8, the outlet gas of the ammonia synthesizer 11 may be cooled by using the circulated gas as a quenching gas.

Figure 9:
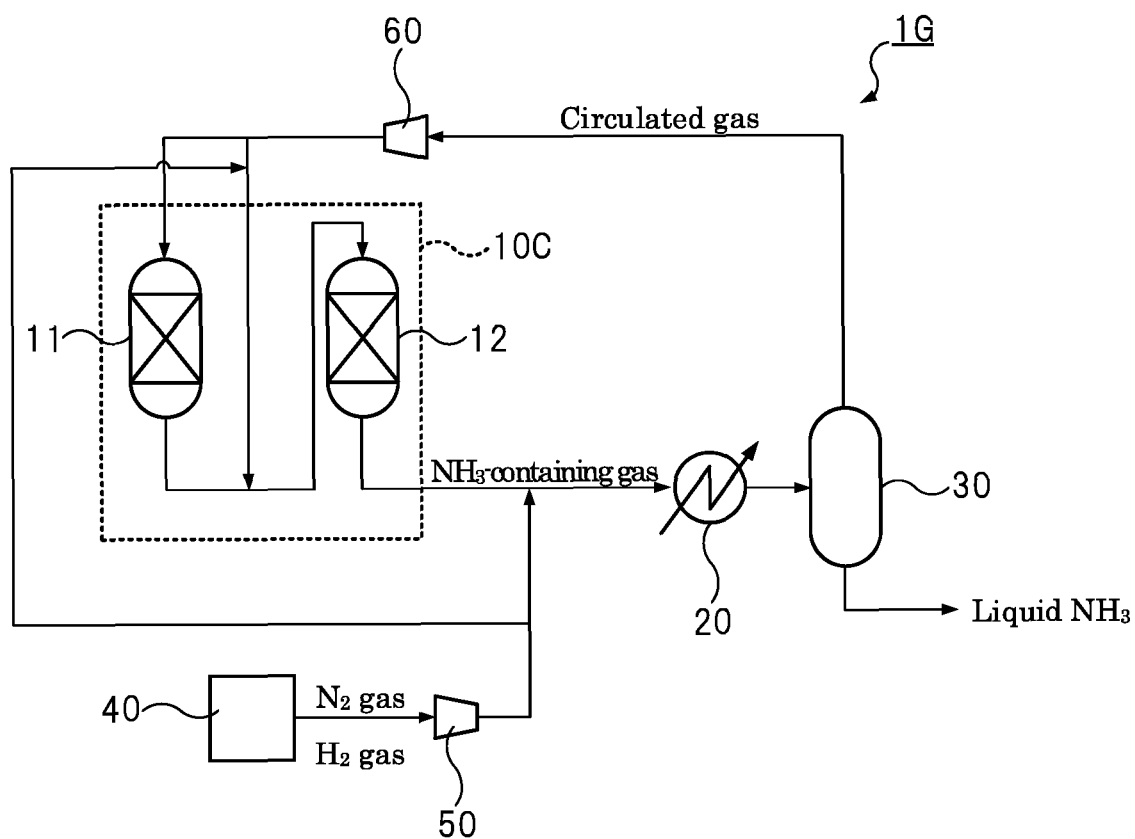
FIG. 9 is a schematic view illustrating a modified example of the ammonia synthesis system according to an embodiment of the present invention.

In addition, like an ammonia synthesis system 1G shown in FIG. 9, the outlet gas of the ammonia synthesizer 11 may be cooled by using the circulated gas having added thereto the nitrogen gas and hydrogen gas supplied from the ammonia synthesizing gas supplying unit 40 as a quenching gas.

Modified Example 4

Figure 10:
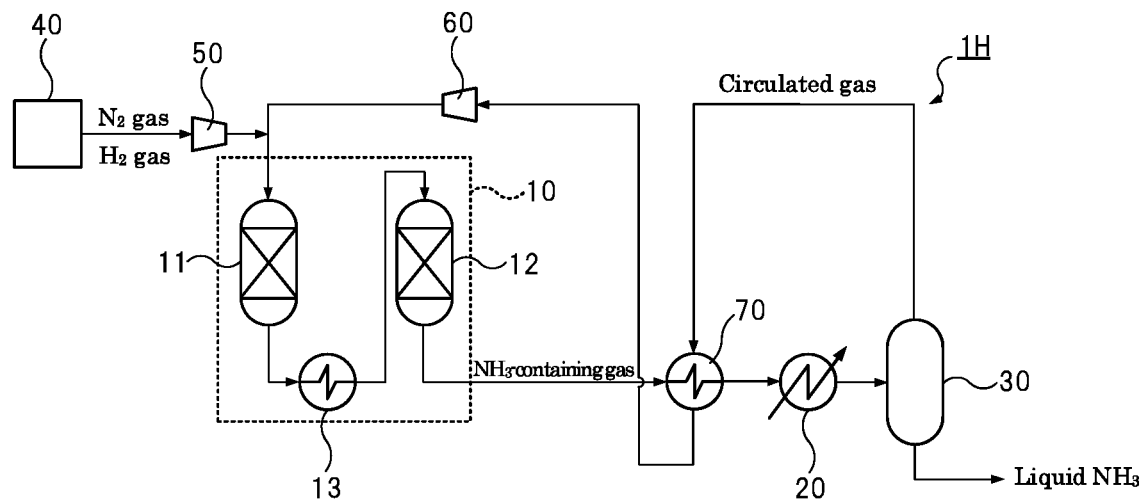
FIG. 10 is a schematic view illustrating a modified example of the ammonia synthesis system according to an embodiment of the present invention.

Like an ammonia synthesis system 1H shown in FIG. 10, the circulated gas separated by the gas-liquid separator 30 may be supplied to the ammonia synthesis reaction unit 10 after heat exchange with the ammonia-containing gas using a heat exchanger 70. Since the temperature of the ammonia-containing gas is decreased by the heat exchange with the circulated gas, the driving energy of the cooler can be reduced.

Modified Example 5

Figure 11:
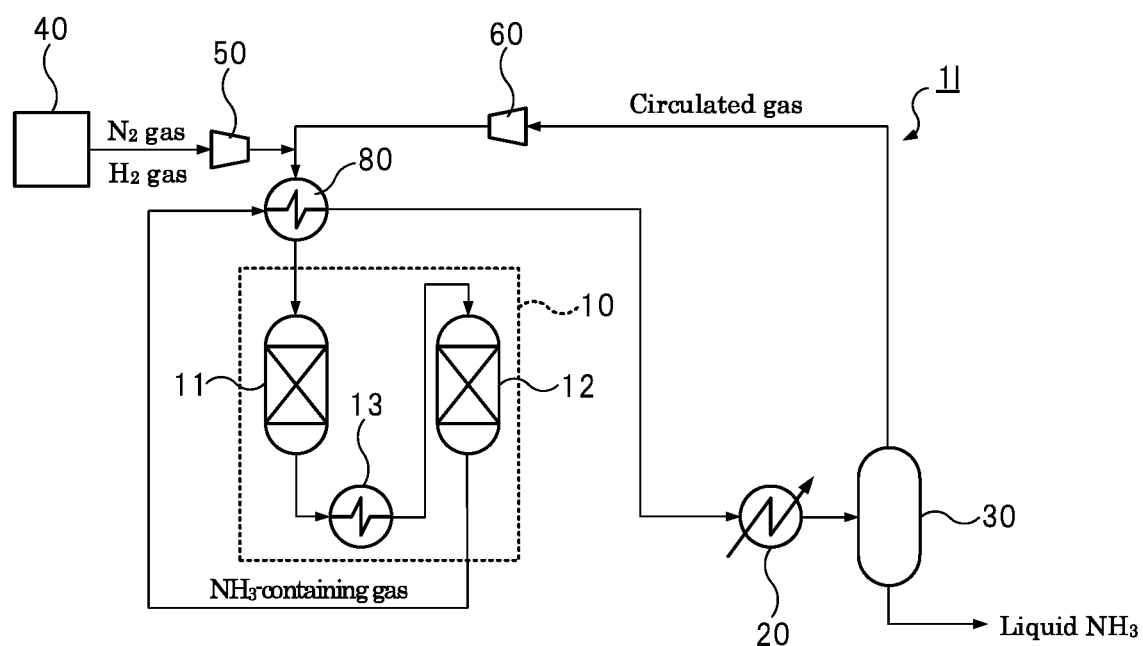
FIG. 11 is a schematic view illustrating a modified example of the ammonia synthesis system according to an embodiment of the present invention.

Like an ammonia synthesis system 1I shown in FIG. 11, the ammonia-containing gas discharged from the ammonia synthesis reaction unit 10 may be subjected to heat exchange with the circulated gas to be supplied to the ammonia synthesis reaction unit 10 using a heat exchanger 80 before being supplied to the ammonia cooler 20. Since the temperature of the ammonia-containing gas is decreased by heat exchange with the circulated gas, the driving energy of the cooler can be reduced.

The above explanation is only an example, and the ammonia synthesis system of the present invention is in no way to be limited to the ammonia synthesis system according to an embodiment of the present invention and the modified examples described above.

The ammonia synthesis system according to an embodiment of the present invention and the modified examples thereof can be combined and the modified examples can be combined.

[Method for Producing Ammonia of the Present Invention]

The method for producing ammonia of the present invention includes: an ammonia-containing gas production step of reacting nitrogen and hydrogen using an ammonia synthesis catalyst under a condition of a reaction pressure of 10 MPa or less to produce an ammonia-containing gas which contains ammonia gas; an ammonia-containing gas cooling step of cooling the ammonia-containing gas produced by the ammonia-containing gas production step; an ammonia separation step of separating ammonia liquefied by cooling of the ammonia-containing gas by the ammonia-containing gas cooling step from a circulated gas which contains unreacted nitrogen gas, unreacted hydrogen gas, and ammonia gas, to obtain liquefied ammonia; and an ammonia synthesizing gas supply step of supplying nitrogen gas and hydrogen gas to be added to at least one of the ammonia-containing gas and the circulated gas, the ammonia-containing gas production step being a step of reacting nitrogen and hydrogen using the circulated gas or the circulated gas having added thereto the nitrogen gas and hydrogen gas supplied by the ammonia synthesizing gas supply step, the circulated gas used in the ammonia-containing gas production step having an ammonia gas concentration of 3% by volume or more. The method for producing ammonia of the present invention will be described in detail below.

(Ammonia-Containing Gas Production Step)

In the ammonia-containing gas production step, nitrogen and hydrogen are reacted using an ammonia synthesis catalyst under a condition of a reaction pressure of 10 MPa or less to produce an ammonia-containing gas which contains ammonia gas. Then, nitrogen and hydrogen are reacted using the circulated gas or the circulated gas having added thereto the nitrogen gas and hydrogen gas supplied by the ammonia synthesizing gas supply step. Note that the ammonia synthesis catalyst used in the ammonia-containing gas production step, the reaction pressure and reaction temperature in the ammonia synthesis reaction, and the ammonia gas concentration in the circulated gas are the same as those described above in the ammonia synthesis reaction unit of the ammonia synthesis system according to an embodiment of the present invention, and thus, the explanations of the ammonia synthesis catalyst used in the ammonia-containing gas production step, the reaction pressure and reaction temperature in the ammonia synthesis reaction, and the ammonia gas concentration in the circulated gas are omitted.

<First Ammonia-Containing Gas Production Step and Second Ammonia-Containing Gas Production Step>

The ammonia-containing gas production step preferably includes a first ammonia-containing gas production step and a second ammonia-containing gas production step as described below.

In the first ammonia-containing gas production step, nitrogen and hydrogen are reacted using the circulated gas or the circulated gas having added thereto the nitrogen gas and hydrogen gas supplied by the ammonia synthesizing gas supply step and using an ammonia synthesis catalyst to produce a first ammonia-containing gas which contains ammonia gas. In the second ammonia-containing gas production step, nitrogen and hydrogen are reacted using the first ammonia-containing gas production step and the first ammonia-containing gas and using an ammonia synthesis catalyst to produce a second ammonia-containing gas which contains ammonia gas at a concentration higher than in the first ammonia-containing gas.

Thus, the ammonia gas concentration in the ammonia-containing gas produced in the ammonia-containing gas production step can be further increased.

Note that the first ammonia-containing gas production step is the same as the ammonia synthesis in the ammonia synthesis reactor 11 of the ammonia synthesis reaction unit 10 in the ammonia synthesis system 1 according to an embodiment of the present invention. In addition, the second ammonia-containing gas production step is the same as the ammonia synthesis in the ammonia synthesis reactor 12 of the ammonia synthesis reaction unit 10 in the ammonia synthesis system 1 according to an embodiment of the present invention. Thus, the explanations of the first ammonia-containing gas production step and the second ammonia-containing gas production step are omitted.

From the viewpoint that the ammonia synthesis reaction is an exothermal reaction and the viewpoint of adjusting the ammonia synthesis reaction temperature within the above reaction temperature range, the temperature of the circulated gas or the circulated gas having added thereto the nitrogen gas and hydrogen gas supplied by the ammonia synthesizing gas supply step used in the first ammonia-containing gas production step and the temperature of the first ammonia-containing gas used in the second ammonia-containing gas production step (for example, the inlet gas temperature of the ammonia synthesis reactor 12) are each preferably 100 to 600° C., more preferably 200 to 500° C., and further preferably 250 to 450° C.

In addition, from the viewpoint of the capability of efficiently synthesizing ammonia, the circulated gas or the circulated gas having added thereto the nitrogen gas and hydrogen gas supplied by the ammonia synthesizing gas supply step used in the first ammonia-containing gas production step and the first ammonia-containing gas used in the second ammonia-containing gas production step each have a ratio of hydrogen gas to nitrogen gas ($H_2/N_2$: molar ratio) of preferably 0.5 to 4.0, more preferably 1.5 to 3.3, and further preferably 1.5 to 3.0.

<First Ammonia-Containing Gas Cooling Step Using Heat Exchanger>

The ammonia-containing gas production step may include a first ammonia-containing gas cooling step of cooling the first ammonia-containing gas by heat exchange. Then, in the second ammonia-containing gas production step, the second ammonia-containing gas may be produced by using the first ammonia-containing gas cooled by the first ammonia-containing gas cooling step. Note that the first ammonia-containing gas cooling step is the same as the cooling of the outlet gas of the ammonia synthesis reactor 11 by the heat exchanger 13 of the ammonia synthesis reaction unit 10 in the ammonia synthesis system 1 according to an embodiment of the present invention, and thus, the explanation of the first ammonia-containing gas cooling step is omitted.

<First Ammonia-Containing Gas Cooling Step Using Quenching Gas>

The ammonia-containing gas production step may include a first ammonia-containing gas cooling step of cooling the first ammonia-containing gas by using at least either of the nitrogen gas and hydrogen gas supplied by the ammonia synthesizing gas supply step or the circulated gas. Then, in the second ammonia-containing gas production step, the second ammonia-containing gas may be produced by using the first ammonia-containing gas cooled by the first ammonia-containing gas cooling step. Note that the first ammonia-containing gas cooling step is the same as the cooling of the outlet gas of the ammonia synthesis reactor 11 in Modified Example 2 of the ammonia synthesis system 1 according to an embodiment of the present invention, and thus, the explanation of the first ammonia-containing gas cooling step is omitted.

(Ammonia-Containing Gas Cooling Step)

In the ammonia-containing gas cooling step, the ammonia-containing gas produced by the ammonia-containing gas production step is cooled. Note that the ammonia-containing gas cooling step is the same as the cooling of the ammonia-containing gas by the ammonia cooler 20 in the ammonia synthesis system 1 according to an embodiment of the present invention, and thus, the explanation of the ammonia-containing gas cooling step is omitted.

(Ammonia Separation Step)

In the ammonia separation step, ammonia liquefied by cooling of the ammonia-containing gas by the ammonia-containing gas cooling step is separated from the circulated gas which contains unreacted nitrogen gas, unreacted hydrogen gas, and ammonia gas to obtain liquefied ammonia. Note that the ammonia separation step is the same as the separation of the circulated gas by the gas-liquid separator 30 in the ammonia synthesis system 1 according to an embodiment of the present invention, and thus, the explanation of the ammonia separation step is omitted.

(Ammonia Synthesizing Gas Supply Step)

In the ammonia synthesizing gas supply step, nitrogen gas and hydrogen gas to be added to at least one of the ammonia-containing gas and the circulated gas are supplied. Note that the ammonia synthesizing gas supply step is the same as the supply of nitrogen gas and hydrogen gas by the ammonia synthesizing gas supplying unit 40 in the ammonia synthesis system 1 according to an embodiment of the present invention, and thus, the explanation of the ammonia synthesizing gas supply step is omitted.

(Ammonia Synthesizing Gas Compression Step and Circulated Gas Compression Step)

The method for producing ammonia of the present invention may further include an ammonia synthesizing gas compression step of compressing the nitrogen gas and hydrogen gas supplied by the ammonia synthesizing gas supply step and a circulated gas compression step of compressing the circulated gas separated in the ammonia-containing gas cooling step. Note that the ammonia synthesizing gas compression step and the circulated gas compression step are respectively the same as the compression of nitrogen gas and hydrogen gas by the ammonia synthesizing gas compressor 50 and the compression of the circulated gas by the circulated gas compressor in the ammonia synthesis system 1 according to an embodiment of the present invention, and thus, the explanations of the ammonia synthesizing gas compression step and the circulated gas compression step are omitted.

EXAMPLES

The present invention will be described in more detail below with reference to examples. Note that the present invention is not limited to the following examples.

Figure 12:
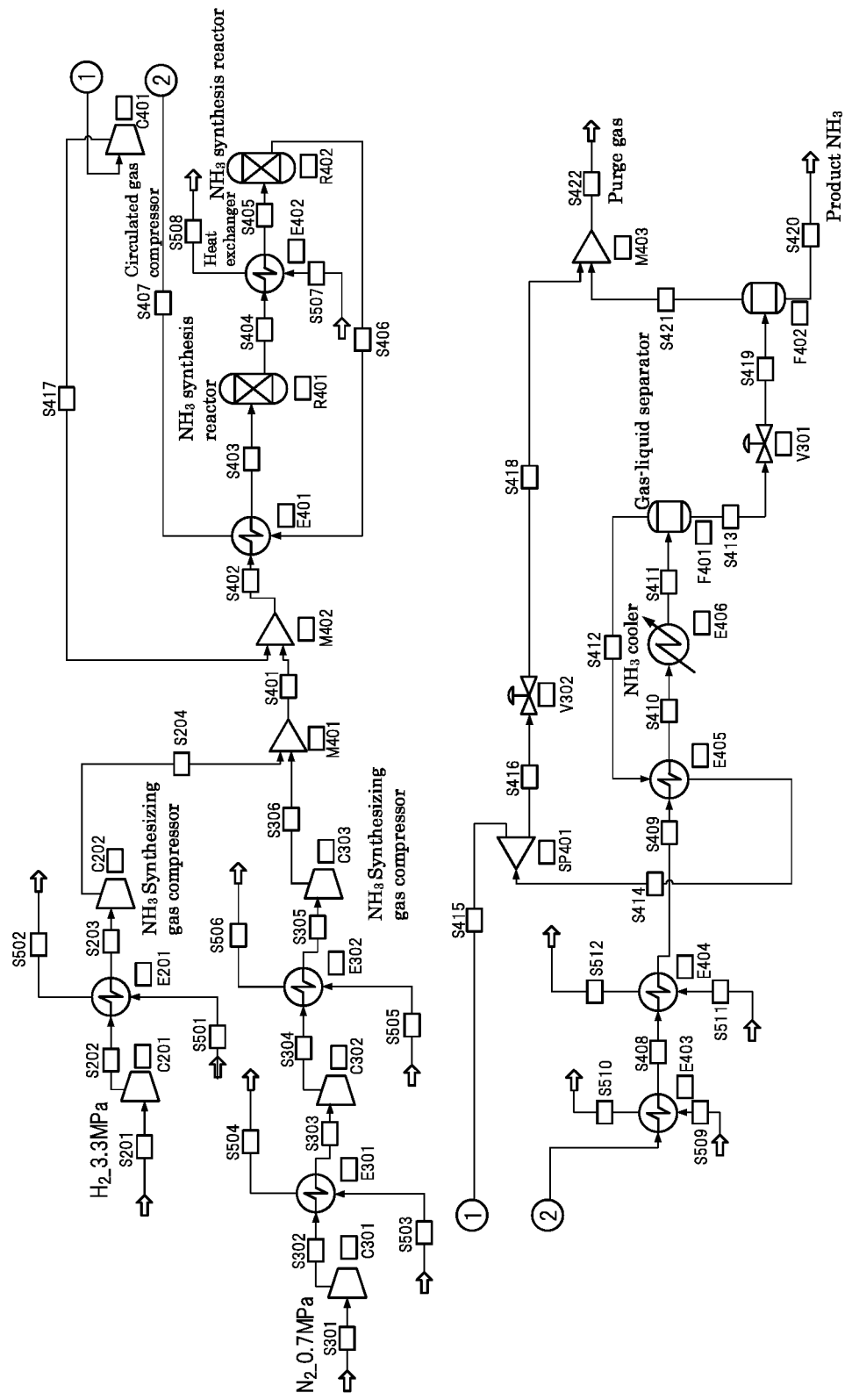
FIG. 12 a schematic view illustrating a configuration of a system used in simulation in Examples.

Ammonia synthesis was simulated under the conditions shown in Table 1 and the conditions described below to determine the power of gas compressors that consume the largest power in the ammonia synthesis system. The system configuration used in the simulation is shown in FIG. 12. Note that the ammonia gas concentration in the circulated gas supplied to the ammonia synthesis reaction unit in the ammonia synthesis system according to an embodiment of the present invention corresponds to the ammonia concentration in S403 in the ammonia synthesis system shown in FIG. 12.

Note that, by using an ammonia synthesis catalyst having a high catalytic activity under a low temperature and a low pressure, the results of the following simulation can be reproduced in a practical ammonia synthesis system. For example, FIG. 1 in Angewandte Chemie International Edition, 2018, Vol. 57, pp. 2648-2652 shows that an Ru/Ba—Ca(NH$_2$)$_2$ catalyst (a supported metal catalyst prepared using a composite of a carrier substrate containing a metal oxide and a metal amide as a carrier), a Cs—Ru/MgO catalyst, and an Fe catalyst (an iron catalyst of the Wustite structure) have a high activity at a pressure of 0.9 MPa and at a temperature of 300 to 400° C. By at least using the catalysts, the results of the following simulation can be reproduced in a practical ammonia synthesis system. Of course, besides the catalysts, the ammonia synthesis catalysts described in the section of "Ammonia synthesis catalyst" above also have a high catalytic activity under a low temperature and a low pressure, and thus, the ammonia synthesis catalysts can be used to reproduce the results of the following simulation in a practical ammonia synthesis system.

(Conditions of Simulation of Ammonia Synthesis)

NH$_3$ production: 20,000 tons/years (operated 24 hours/day, 330 days/year)

Simulation soft: "PRO/II", manufactured by Invensys Process Systems Japan, Inc.

Physical properties estimation formula: SRKM

Note that the simulation was performed with a raw material hydrogen supplying pressure of 3.3 MPa, a nitrogen supplying pressure of 0.7 MPa, a pressure increase range of the circulated gas compressor of 0.3 MPa, and an efficiency of the compressor of 80%.

Table 1 shows the evaluation results of the powers of the gas compressors by the simulation.

TABLE 1

| | Unit | Example 1 | Example 2 | Example 3 | Example 4 | Example 5 | Comparative Example 1 | Comparative Example 2 |
|---|---|---|---|---|---|---|---|---|
| Reaction pressure in ammonia synthesis reaction (R401) (R402) | MPa | 3 | 3 | 3 | 5 | 7 | 25 | 12 |
| $NH_3$ concentration (S403) | % by volume | 3.1 | 5.5 | 7.1 | 8.2 | 9.2 | 7.1 | 1.9 |
| Temperature of $NH_3$ synthesis reactor inlet gas (R401) (R402) | °C. | 400 | 350 | 300 | 300 | 250 | 300 | 300 |
| Ammonia-containing gas cooling temperature (E406) | °C. | −36 | −23 | −16 | 0 | 15 | 30 | −16 |
| Amount of $NH_3$ synthesis reactor inlet gas (S403) | $Nm^3/h$ | $9.8 \times 10^4$ | $7.2 \times 10^4$ | $4.7 \times 10^4$ | $3.7 \times 10^4$ | $2.4 \times 10^4$ | $4.7 \times 10^4$ | $2.1 \times 10^4$ |
| Raw material gas compressors (total of C201, C202, C301, C302, C303) | kW | 112 | 112 | 112 | 259 | 369 | 807 | 574 |
| Power of circulated gas compressor (C401) | kW | 319 | 226 | 140 | 72 | 29 | 22 | 14 |
| Total of compressor powers | kW | 431 | 338 | 252 | 331 | 398 | 829 | 588 |

Note that the results of the above simulation can also be reproduced by using any of the catalysts described in the section "Ammonia synthesis catalyst". However, among the catalysts described in the section "Ammonia synthesis catalyst", from the viewpoint of a high catalytic activity under the conditions of the simulation, in other words, from the viewpoint of having a high catalytic activity even at a low temperature, the catalysts mentioned as preferred catalysts in the section "Ammonia synthesis catalyst" are preferred also as an ammonia synthesis catalyst that reproduces the simulation results.

As shown in Table 1, it was found that when the reaction pressure in the ammonia synthesis reaction was 10 MPa or less and the ammonia gas concentration in the circulated gas supplied to the ammonia synthesis reaction unit was 3% by volume or more, the power of the gas compressors which consume the largest power in the ammonia synthesis system can be reduced while securing the ability to produce ammonia of 20,000 ton/year.

As can be seen from Comparative Example 1, it was found that when ammonia gas containing unreacted gases was cooled with a temperature of 30° C. as in the ammonia synthesis system described in PTL 1, for securing the ability to produce ammonia of 20,000 ton/year, the reaction pressure in the ammonia synthesis reaction was to be 25 MPa which is much larger than 10 MPa, and thus, the power of gas compressors which consume the largest power in the ammonia synthesis system was increased.

As can be seen from Comparative Example 2, it was found that when the reaction pressure in the ammonia synthesis reaction was larger than 10 MPa, for securing the ability to produce ammonia of 20,000 tons/year, the ammonia gas concentration of the circulated gas supplied to the ammonia synthesis reaction unit was not to be 3% by volume or more, but the power of the gas compressors which consume the largest power in the ammonia synthesis system was increased.

REFERENCE SIGNS LIST 1, 1A to 1I: ammonia synthesis system
10, 10A to 10D: ammonia synthesis reaction unit
11, 12, 14: ammonia synthesis reactor
13, 70, 80: heat exchanger
20: ammonia cooler
30: gas-liquid separator
40: ammonia synthesizing gas supplying unit
50: ammonia synthesizing gas compressor
60: circulated gas compressor

The invention claimed is:

1. An ammonia synthesis system, comprising:
an ammonia synthesis reaction unit including one or two or more ammonia synthesis reactor(s) that synthesize ammonia from nitrogen and hydrogen using an ammonia synthesis catalyst under a condition of a reaction pressure of 10 MPa or less;
an ammonia cooler that cools an ammonia-containing gas which is discharged from the ammonia synthesis reaction unit and which contains ammonia gas synthesized by the ammonia synthesis reaction unit;
a gas-liquid separator that separates liquefied ammonia produced from the ammonia-containing gas cooled by the ammonia cooler from a circulated gas which contains unreacted nitrogen gas, unreacted hydrogen gas, and ammonia gas; and
an ammonia synthesizing gas supplying unit that supplies nitrogen gas and hydrogen gas to be added to at least one of the ammonia-containing gas and the circulated gas,
the circulated gas having added thereto the nitrogen gas and hydrogen gas supplied by the ammonia synthesizing gas supplying unit being supplied to the ammonia synthesis reaction unit,
the circulated gas supplied to the ammonia synthesis reaction unit having an ammonia gas concentration of 6% by volume or more.

2. The ammonia synthesis system according to claim 1, wherein the ammonia cooler cools the ammonia-containing gas with a cooling temperature of −40 to 15° C.

3. The ammonia synthesis system of claim 1, wherein the ammonia synthesis reaction unit comprises two or more ammonia synthesis reactors, the two or more ammonia synthesis reactors being connected in series.

4. The ammonia synthesis system of claim 1, wherein each of the ammonia synthesis reactors in the ammonia synthesis reaction unit has an inlet gas having a temperature of 100 to 600° C.

5. The ammonia synthesis system of claim 1, wherein the ammonia synthesis reaction unit further comprises two or more ammonia synthesis reactors and a heat exchanger that cools an outlet gas of the ammonia synthesis reactors.

6. The ammonia synthesis system of claim 1, wherein an outlet gas of one or two or more ammonia synthesis reactors is cooled by using at least either of the nitrogen gas and hydrogen gas supplied by the ammonia synthesizing gas supplying unit or the circulated gas.

7. The ammonia synthesis system of claim 1, wherein each of the ammonia synthesis reactors in the ammonia synthesis reaction unit has an inlet gas having a ratio of hydrogen gas to nitrogen gas ($H_2/N_2$: molar ratio) of 0.5 to 4.

8. The ammonia synthesis system of claim 1, further comprising
- an ammonia synthesizing gas compressor that compresses the nitrogen gas and hydrogen gas supplied by the ammonia synthesizing gas supplying unit, and
- a circulated gas compressor that compresses the circulated gas separated by the gas-liquid separator.

9. The ammonia synthesis system of claim 1, wherein the ammonia cooler cools the ammonia-containing gas by heat exchange between a liquid having a boiling point at 1 atm of −33.0° C. or higher and the ammonia-containing gas.

\* \* \* \* \*